US012266357B2

United States Patent
Eyben et al.

(10) Patent No.: US 12,266,357 B2
(45) Date of Patent: Apr. 1, 2025

(54) VOICE COACHING SYSTEM AND RELATED METHODS

(71) Applicant: GN Audio A/S, Ballerup (DK)

(72) Inventors: Florian Eyben, Gilching (DE); Christian Lillelund, Ballerup (DK); Anders Hvelplund, Ballerup (DK); Ali Özkil, Ballerup (DK)

(*) Notice: Subject to any disclaimer, the term of this patent is extended or adjusted under 35 U.S.C. 154(b) by 400 days.

(21) Appl. No.: 17/542,542

(22) Filed: Dec. 6, 2021

(65) Prior Publication Data

US 2022/0199080 A1 Jun. 23, 2022

(30) Foreign Application Priority Data

Dec. 22, 2020 (DK) .............................. PA202070869

(51) Int. Cl.
*G10L 15/22* (2006.01)
*G10L 15/06* (2013.01)

(52) U.S. Cl.
CPC ............ *G10L 15/22* (2013.01); *G10L 15/063* (2013.01); *G10L 2015/0636* (2013.01); *G10L 2015/0638* (2013.01); *G10L 2015/225* (2013.01)

(58) Field of Classification Search
CPC ................... G10L 15/22; G10L 15/063; G10L 2015/0636; G10L 2015/0638; G10L 2015/225
See application file for complete search history.

(56) References Cited

U.S. PATENT DOCUMENTS

| 11,089,157 B1* | 8/2021 | Lumsden ............ H04M 3/5175 |
| 11,315,065 B1* | 4/2022 | Myers ...................... G10L 15/16 |
| 11,640,767 B1* | 5/2023 | Bridges .................... G09B 5/02 |
| | | 434/257 |
| 2003/0229497 A1 | 12/2003 | Wilson et al. |
| 2005/0114133 A1* | 5/2005 | Mark ....................... G10L 15/26 |
| | | 704/251 |
| 2007/0213982 A1 | 9/2007 | Xi et al. |
| 2013/0016823 A1* | 1/2013 | Odinak ............... H04M 3/5235 |
| | | 379/265.02 |
| 2018/0096278 A1* | 4/2018 | Lev-Tov ................. G10L 15/22 |

(Continued)

FOREIGN PATENT DOCUMENTS

| EP | 2027572 | 2/2009 |
| EP | 2924676 | 9/2015 |

(Continued)

OTHER PUBLICATIONS

Li Yng et al: Acoustic Measures for Real-Time Voice Coaching, KDD '20, Aug. 23-27, 2020. Virtual event, USA. pp 2755-2763.

*Primary Examiner* — Brian L Albertalli

(57) ABSTRACT

Voice coaching system, voice coaching device, and related methods, in particular a method of operating a voice coaching system comprising a voice coaching device is disclosed, the method comprising obtaining audio data representative of one or more voices, the audio data including first audio data of a first voice; obtaining first voice data based on the first audio data; determining whether the first voice data satisfies a first training criterion; in accordance with determining that the first voice data satisfies the first training criterion, determining a first training session; outputting, via the interface of the voice coaching device, first training information indicative of the first training session.

18 Claims, 6 Drawing Sheets

(56) References Cited

U.S. PATENT DOCUMENTS

| | | | |
|---|---|---|---|
| 2019/0139447 A1* | 5/2019 | Crawford | G10L 15/1807 |
| 2019/0245973 A1* | 8/2019 | Dwyer | H04M 3/5191 |
| 2019/0355043 A1* | 11/2019 | Swierk | G06N 5/02 |
| 2020/0111377 A1* | 4/2020 | Truong | G09B 5/12 |
| 2020/0135041 A1* | 4/2020 | Arslan | G06Q 10/06398 |
| 2020/0294421 A1 | 9/2020 | Stevens | |
| 2021/0090576 A1* | 3/2021 | Salazar | G10L 25/66 |
| 2021/0390491 A1* | 12/2021 | Ellison | G06F 9/453 |
| 2022/0020288 A1* | 1/2022 | Naber | G10L 15/187 |
| 2022/0253789 A1* | 8/2022 | Myers | H04M 3/5175 |

FOREIGN PATENT DOCUMENTS

| | | |
|---|---|---|
| WO | 0116570 | 3/2001 |
| WO | 2009153788 | 12/2009 |
| WO | 2018182763 | 10/2018 |

* cited by examiner

VOICE COACHING SYSTEM AND RELATED METHODS

The present disclosure relates to speech processing and related tools and methods, and systems in particular for analysing, monitoring, coaching, and/or evaluating speech of one or more speakers, for example a caller and/or an agent of a call and/or one or more participants of a telephone conversation or a meeting, such as an online meeting. Thus, a system, a voice coaching device, and related methods, in particular a method of operating a voice coaching system comprising a voice coaching device is provided.

BACKGROUND

Today the interaction between people is increasingly taking place at a distance and virtually, e.g. via telephone calls, conference calls, and the like. However, it may be difficult for people speaking to each other on each side of a telephone call, to grasp emotions or sentiments of the other party by just listening to a speech. The voice and/or speech competences of people is becoming more and more important.

For example, almost all support and after sales is performed over the phone between call center agents initiating and/or answering the calls and potential customers being contacted or customers contacting call center agents with various issues. Call center agents working at call centers, support center, or contact centers struggle with a job that can at time be monotonous and repetitive. This represents a negative experience for the agents, but it also leads to a worse tone performance, and in turn a lower customer satisfaction for the customers on the other end of the line and on average, longer calls. After taking calls for many hours, it can be difficult to remember that there is a human being on the other side of the call, who are longing for help to solve a problem. Furthermore, it may also be difficult for a speaker to improve his/her speech skills.

SUMMARY

Accordingly, there is a need for voice coaching systems, voice coaching devices, and methods of operating voice coaching systems having improved speech processing.

A method of operating a voice coaching system comprising a voice coaching device and/or a server device, is disclosed, the method comprising obtaining audio data representative of one or more voices, the audio data including first audio data of a first voice; obtaining first voice data based on the first audio data; determining whether the first voice data satisfies a first training criterion; in accordance with determining that the first voice data satisfies the first training criterion, determining a first training session; and outputting, e.g. from the server device to the voice coaching device and/or via the interface of the voice coaching device, first training information indicative of the first training session.

Further, a voice coaching system is disclosed, the voice coaching system comprising a voice coaching device and optionally a server device, wherein the voice coaching device is configured to perform any of the methods according to this disclosure.

Also disclosed is a voice coaching device comprising an interface, a processor, and a memory, the processor may be configured to perform at least parts of any the methods disclosed herein. For example, determine voice data, speaker metric data, detect a termination of a conversation, determining whether the voice data satisfies a first training criterion, determine a training session and/or determine and/or output training information may be performed at the voice coaching device. For example, determining deficiency data, a training representation, an exercise, may be performed at the voice coaching device. The training session and/or the training information may be transmitted to the server device, e.g. to be stored.

Also disclosed is a server device comprising an interface, one or more processors, and a memory, the one or more processors may be configured to perform at least parts of any the methods disclosed herein. For example, determine voice data, speaker metric data, detect a termination of a conversation, determining whether the voice data satisfies a first training criterion, determine a training session and/or determine and/or output training information may be performed at the server device. For example, determining deficiency data, a training representation, an exercise, may be performed at the server device. The training session and/or the training information may be transmitted to the voice coaching device for output, such as display, via the voice coaching device.

An advantage of the present disclosure is that the voice coaching system may improve the speech and/or the voice competences of users using the voice coaching system, and in turn improve the customer satisfaction of the customers that the users speak to. The present disclosure may also improve the efficiency of conversations and/or calls, leading e.g. to shorter and more efficient conversations/calls. This may also reduce the costs for people and/or companies e.g. of calls centers, where an important part of the employees' job is to have conversations with customers. The present disclosure may also provide a development path or area for the users to improve their skills and/or competences in time, e.g. helping users to reach and/or improve their key performance indicators, KPIs. The voice coaching system may provide a continuous consistent training of users over time, e.g. in order to keep the users of the voice coaching system fit for practice. The voice coaching system may provide follow-up plans for the users, such as training schemes. Additionally, the present disclosure may provide a personalized/customized training/coaching of one or more users/speakers. The voice coaching system may reduce or avoid the need for having an actual trainer or person training the user. It may be too costly for some companies to have dedicated people training their employees. The employees may therefore in some cases do not have any training at all, which may have a negative influence on the performances of the employees and no perspective of skill development.

Furthermore, the user may get an improved feedback on his/her performance or on the outcome of a conversation. The user may get feedback after one or more conversations and be trained or coached based on his/her performances and/or the feedback. The voice coaching system may identify, demonstrate, or diagnose deficiencies and/or strengths of the voice of the user. Further, the voice coaching system may correlate improvements in the voices of users with improvements in customer satisfaction. The voice coaching system may provide a gamification of the users' performances. The voice coaching system may for example increase the engagement of a user in his/her work, e.g. by being able to visualize an improvement of performances. The voice coaching system may for example increase the motivation of the user and give an incentive or a motivational factor to perform better. The user may improve his/her speaking capabilities, e.g. improving consistency during the day by keeping a positive/great tone with a negative speaker, avoid poor speech performance, such as interruptions, long pauses, monotony, and/or speaking rate.

It is an advantage of the present disclosure that a speaker/user is able to monitor/evaluate a conversation, a customer, and/or a meeting, in turn allowing the speaker/user to accommodate or adapt the speaker's speech, such as tone of the speech, to improve his/her performance during a conversation. This may improve an outcome of a presentation by the speaker and/or an outcome of a conversation or meeting between the speaker and one or more other speakers. The speaker may further have an improved understanding of a conversation and/or of the other speaker, e.g. a better grasp of emotions of the other speaker. The speaker/user may for example be able to see when a customer/caller have flipped in the last conversation/call or streak of conversations/calls, e.g. changed from a negative speaker state to a positive speaker state.

BRIEF DESCRIPTION OF THE DRAWINGS

The above and other features and advantages of the present invention will become readily apparent to those skilled in the art by the following detailed description of exemplary embodiments thereof with reference to the attached drawings, in which.

DETAILED DESCRIPTION

Figure 1:
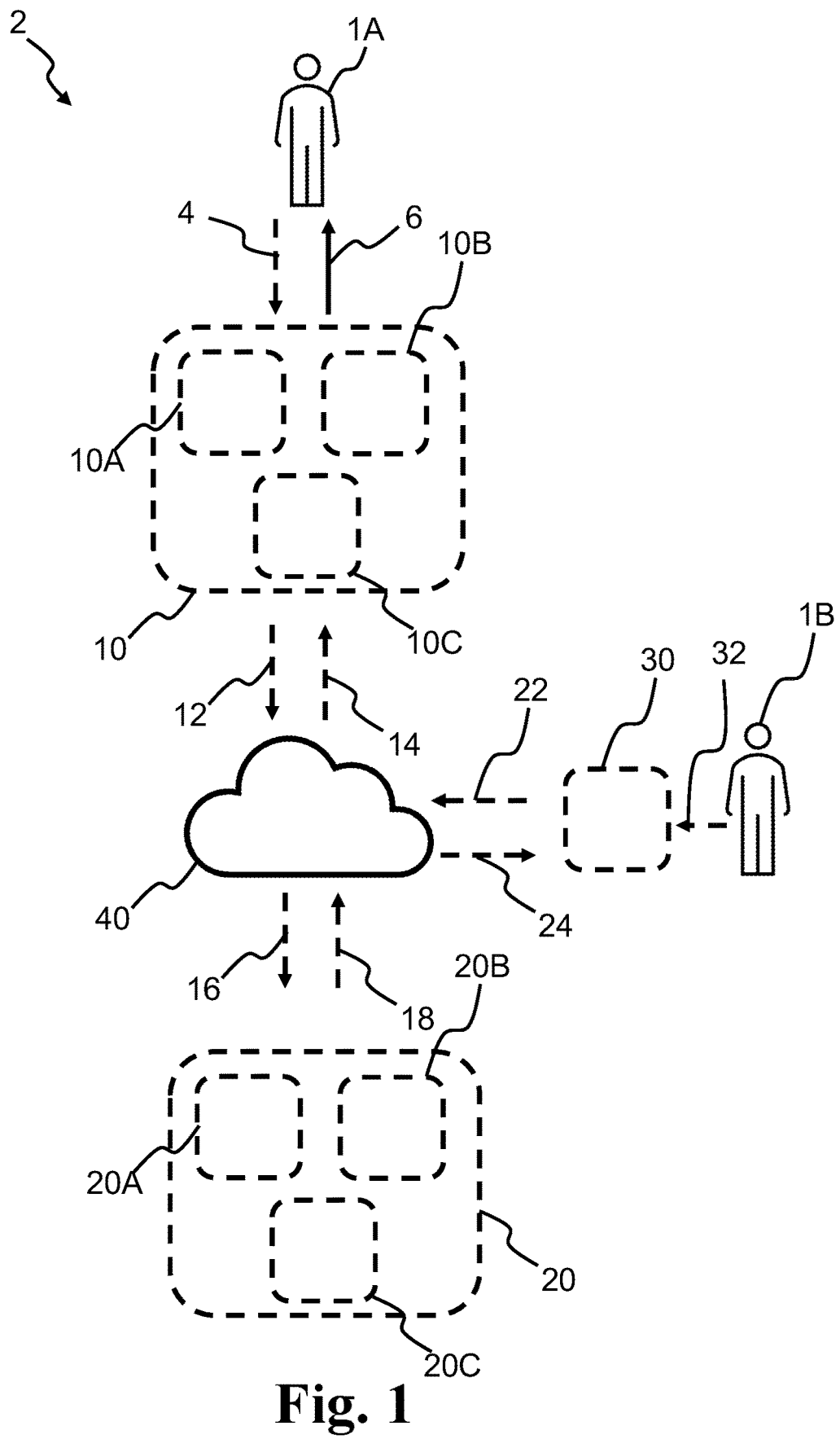
FIG. 1 schematically illustrates an exemplary voice coaching system comprising a server device and a voice coaching device according to the present disclosure.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A method of operating a voice coaching system comprising a voice coaching device is disclosed. The voice coaching system may optionally comprise a server device comprising an interface, one or more processors, and a memory. The server device may be configured on a cloud, such as a cloud network. The voice coaching system may be a system for training and/or coaching one or more users, e.g. the voice and/or speech of one or more users. The voice coaching system may be a system for monitoring, handling, and/or analysing audio data representative of one or more voices, e.g. comprising one or more audio signals including audio signal(s) of one or more speakers talking, e.g. as a monologue or a conversation, such as a meeting conversation, a video/telephone conference conversation, or a call, e.g. a telephone or VoIP call. The system may be a system for monitoring, handling, and/or analysing one or more audio signals, such as a monologue of a speaker or a conversation, e.g. between two or more people/speakers, such as a conversation in a phone call or a meeting. The voice coaching system may for example be part of, comprise, or act as a call center system for monitoring, handling, and/or analysing one or more audio signals, such as a monologue of a speaker or conversations between two or more people, e.g. a phone call between an agent of the call center system and a customer or caller. The system may be configured to use edge processing between one or more voice coaching devices. The system may be configured to use edge processing between one or more voice coaching devices. Different operations and/or steps of the method and/or the system may be performed at different devices, such as at the voice coaching device and/or at the server device.

The voice coaching device comprises an interface, a processor, and a memory. The voice coaching device may be an electronic device. The voice coaching device may for example be or comprise a mobile phone, such as a smartphone, a computer, such as a laptop computer or PC, or a tablet computer. The voice coaching device may for example be a user device, such as a mobile phone or a computer, configured to perform a call between a user and one or more persons. The voice coaching device may be configured to obtain audio data, e.g. comprising first audio input, such as first audio input from a first voice. The audio data may be obtained from a call between the user and another person. For example, the voice coaching device may act as call agent device where the user may be an agent, such as an agent of a call center, such as a support call center, an after sales call center, a marketing call center, a reception call center, or a sales call center, or companies where an important part of the employees' job is to have conversations with customers. The voice coaching device may for example be a user device, such as a mobile phone or a computer, configured to record first audio input from a first speaker, such as record the first speaker speaking or talking. The voice coaching device may be configured to obtain audio data, e.g. comprising one or more audio signals, such as generate one or more audio signals, including first audio data, e.g. comprising a first audio signal. The first audio signal may be based on the first audio input.

The method comprises obtaining audio data, also denoted AD, representative of one or more voices. The audio data includes first audio data, also denoted AD_1, of a first voice, e.g. the first voice being the voice of a first speaker, such as a user of the voice coaching system/voice coaching device.

The audio data AD, may comprise one or more audio signals, also denoted $AS\_i$, $i=1, 2, \ldots N$, where N is the number of speakers/audio signals, over time. The one or more audio signals may include a first audio signal, also denoted AS_1, of a first voice. The first voice may be a voice of a first voice communication of the first speaker and/or a plurality of voice communications of the first speaker. The first audio signal may be representative of first speech/voice of a first speaker of a first conversation. The first speaker may be a caller, an agent, or a first participant in a telephone conversation or a meeting, e.g. comprising the first conversation and/or a plurality of conversations, such as where the first conversation and/or the plurality of conversations take place. The one or more audio signals optionally include a second audio signal, also denoted AS_2. The second audio signal may be representative of a second speech/voice of a second speaker of the first conversation and/or of a plurality of conversations. The second speaker may be a caller, an agent, an interviewer, or a second participant in a telephone conversation or a meeting, e.g. comprising the first conversation, such as where the first conversation takes place.

Obtaining audio data may comprise obtaining one or more audio inputs from one or more conversations performed by a speaker/user, such as a first audio input from one or more conversations performed by the first speaker/user. In other words, the first audio data may be based on the first audio input. The first audio data may be obtained from a call or conversation between the user and another person, e.g. a first call or the first conversation and/or of a plurality of conversations performed by the first speaker/user. The first speaker may be the person speaking/talking the most during the first call and/or the first conversation. The first speaker may be the first person speaking during the first call and/or first conversation and/or during a plurality of conversations. The first speaker may be a person of interest, such as a user that may be voice coached and/or trained. The first audio data may be obtained from the voice coaching device, e.g. recording the first voice, such as first audio input from a first speaker. The first audio data may comprise one or more recorded segments from one or more conversations. The first audio data may be indicative of a segment, such as a speech segment or utterance, which is analysed. For example, a voice activity detection module may identify one or more segments of speech/voice and discard the noise. A segment may for example be a speech segment of at least 5 seconds or at least 10 seconds. The voice activity detection module may detect pauses longer than e.g. 400 ms, 500 ms, or 1 second. A speech segment may be detected when a pause occurs, when another speaker starts speaking, or when a segment reaches a defined maximum length (e.g. at most 8 seconds) may indicate the end of the speech segment. For each speech segment voice data, one or more sentiment metrics and/or one or more appearance metrics may be determined. For example, recording the first speaker speaking or talking. Obtaining audio data may comprise generating first audio data of a first voice. Obtaining audio data may comprise generating one or more audio signals, including the first audio signal. The first audio signal may be based on the first audio input. The first audio signal may comprise a first speaker audio signal. The first audio signal may be an agent audio signal or a caller audio signal, and a second audio signal is the other.

The method comprises obtaining voice data, also denoted VD, based on the audio data AD. The method may comprise obtaining first voice data, also denoted VD_1, based on the first audio data AD_1. The first voice data VD_1 may comprise data indicative of the first voice, e.g. of the first speaker. Obtaining first voice data may comprise generating first voice data of a first voice based on the first audio data. The first voice data may be first agent voice data, such as first voice data of a first user/agent of the voice coaching system. The first voice data may comprise speaker metric data, also denoted SPMD. The voice data, such as the first voice data, may be logged and/or saved on a memory. The voice data, such as the first voice data, may comprise a time-stamp, a date, a type of event, and/or audio of the voice.

In one or more exemplary methods, obtaining voice data based on the audio data comprises determining speaker metric data, also denoted SPMD, of a speaker based on the audio data. In one or more exemplary methods, obtaining first voice data VD_1 based on the first audio data AD_1 comprises determining first speaker metric data, also denoted SPMD_1, of a first speaker based on the first audio data. The first speaker metric data SPMD_1 may include first primary speaker metric data SPMD_1_1. The first speaker metric data may comprise one or more voice parameters/characteristics of the first voice. The first speaker metric data may comprise one or more of tone metric data, speech trait data, and vocal trait data of one or more speakers, such as the first speaker. In other words, the first speaker metric data may comprise one or more of a tone metric, a speech trait metric, and a vocal trait metric of one or more speakers, such as the first speaker.

The first speaker metric data may comprise a first speaker/voice score. In other words, determining the first speaker metric data may comprise determining a first speaker/voice score based on the first audio data. The first speaker score may be determined based on one or more of the tone metric, the speech trait metric, and the vocal trait metric. For example, a general first speaker score for the first speaker may be determined based on the first speaker metric data. Alternatively or additionally, a first speaker score may be determined for each of the speaker metrics, e.g. for the tone metric, the speech trait metric, and the vocal trait metric. In other words, the determined first primary speaker metric data SPMD_1_1, the first secondary speaker metric data SPMD_1_2, and/or the first tertiary speaker metric data SPMD_1_3 may be used to determine, such as transformed, to a voice score or a conversation score. The voice score or conversation score may be determined based on one or more metrics satisfying one or more criteria or not.

The speaker metric data SPMD may comprise one or more speaker metrics over time, e.g. one or more first speaker metrics over time. In other words, determining speaker metric data SPMD may comprise determining one or more speaker metrics SM over time, e.g. over a conversation. Determining first speaker metric data SPMD_1 may comprise determining one or more first speaker metrics SPM_1 over time, e.g. over the first conversation or a first recording of the first speaker.

Determining first speaker metric data SPMD_1 may comprise determining first primary speaker metric data, also denoted SPMD_1_1. Determining first primary speaker metric data SPMD_1_1 may comprise determining one or more first primary speaker metrics SPM_1_1 over time, e.g. over the first conversation or a first recording of the first speaker. In other words, the first speaker metric data SPMD_1 may comprise first primary speaker metric data SPMD_1_1. Further, the first speaker metric data may comprise or be indicative of one or more of the first primary speaker metric data SPMD_1_1 comprising one or more first primary speaker metrics, first secondary speaker metric data SPMD_1_2 comprising one or more first secondary speaker metrics, and first tertiary speaker metric data SPMD_1_3 comprising one or more first tertiary speaker metrics. In other words, determining whether the first voice data satisfies a first training criterion may comprise determining whether the first speaker metric data SPMD satisfies the first training criterion, e.g. whether the first speaker metric data SPMD_1 satisfies the first training criterion. For example, determining whether the first voice data satisfies a first training criterion may comprise determining whether a first speaker metric SPM_1 satisfies the first training criterion.

In one or more exemplary methods, the first primary speaker metric data comprises sentiment metric data. Determining first primary speaker metric data SPMD_1_1 may comprise determining sentiment metric data, also denoted SMD. In one or more exemplary methods, determining first primary speaker metric data SPMD_1_1 may comprise determining one or more first sentiment metrics, also denoted SM_1_i, i=1, 2, ..., M, where M is the number of first sentiment metrics. In other words, the sentiment metric data SMD may comprise one or more first sentiment metrics over time, e.g. over the first conversation.

A sentiment metric is indicative of a sentiment state of a speaker. Sentiment metric data SMD may be indicative of a mean sentiment of a speaker over a conversation. A sentiment metric may comprise one or more of a sentiment type identifier, sentiment level(s), and a confidence score. In other words, determining whether the first voice data satisfies a first training criterion may comprise determining whether the first sentiment data satisfies the first training criterion.

The one or more first sentiment metrics, such as SM_1_1 and/or SM_1_2, are indicative of a first speaker state, i.e. one or more first sentiment states of the first speaker, and may be based on the first audio signal and/or the second audio signal. The one or more first sentiment metrics SM_1_$i$ may comprise one or more parameters indicative of the first speaker state.

The one or more first sentiment metrics SM_1_$i$ may include a first primary sentiment metric, also denoted SM_1_1, indicative of a primary sentiment state of a first speaker. In other words, SM_1_1 may be indicative of a primary emotion of the first speaker. SM_1_1 may be indicative of a dominating sentiment state and/or a first sentiment state in time of the first speaker. The primary sentiment state may be one of disappointed, bored, afraid, sad, negative, very negative, frustrated, fearful, panicking, hesitant, dissatisfied, angry, surprised, worried, wondering, not understanding, thinking, neutral, positive, very positive, glad, friendly, confident, excited, pleased, satisfied, aroused, content, relaxed, energetic, enthusiastic, service-minded, helpful, interested, and happy. In one or more exemplary methods/systems, the primary sentiment state of the first speaker may be selected from a primary set of sentiment states. In one or more exemplary methods, determining whether the first voice data satisfies a first training criterion may comprise determining whether the one or more first sentiment metrics SM_1_$i$ satisfy the first training criterion, e.g. whether the first primary sentiment metric SM_1_1 satisfies the first training criterion. For example, when it has been determined that the first speaker have had a negative speaker state in on or more conversations, such as the last five calls, it may be determined or recommended that the first speaker performs a training session, such as the first training session to improve one or more first sentiment metrics.

A first sentiment metric SM_1_$i$ may comprise a first sentiment type identifier, also denoted ST_ID_1_$i$, where i is an index, and i=1, 2, . . . H, where H is the number of first sentiment type identifiers. In other words, determining one or more first sentiment metrics SM_1_$i$ may comprise determining a first sentiment type identifier ST_ID_1_$i$, e.g. a first primary sentiment type identifier ST_ID_1_1 of the first primary sentiment metric SM_1_1. A sentiment type identifier is indicative of a sentiment state of a speaker.

A sentiment type identifier may for example be a label, a number or value, such as an integer, corresponding to a specific sentiment (state), a sentiment type and/or a sentiment class. For example, ST_ID_1_$i$ may respectively be selected from the same or different sets of sentiment type identifiers. For example, ST_ID_1_1 may be selected from a primary set of sentiment type identifiers and/or ST_ID_1_2 may be selected from a secondary set of sentiment type identifiers. The primary set of sentiment type identifiers may be different from or the same as the secondary set of sentiment type identifiers. The primary set of sentiment type identifiers and the secondary set of sentiment type identifiers may share one or more, such as a plurality of, sentiment type identifiers.

In one or more exemplary methods, the first primary sentiment metric SM_1_1 comprises a first primary sentiment type identifier ST_ID_1_1 selected from a primary set of sentiment type identifiers ST_ID_SET_1, where ST_ID_SET_1 comprises a plurality of sentiment type identifiers, e.g. including at least three, four, five or more sentiment type identifiers.

In one or more exemplary methods, the primary set of sentiment type identifiers ST_ID_SET_1 is given by:

$$ST\_ID\_SET\_1=\{1,2,3,4,5\},$$

where "1" is indicative of a sentiment, such as "Very negative", "2" is indicative of a sentiment, such as "Negative", "3" is indicative of a sentiment, such as "Neutral", optional "4" is indicative of a sentiment, such as "Positive", and optional "5" is indicative of a sentiment, such as "Very positive".

In one or more exemplary methods, the primary set of sentiment type identifiers ST_ID_SET_1 is given by:

$$ST\_ID\_SET\_1=\{\text{"Very negative","Negative","Neutral","Positive","Very positive"}\},$$

e.g. where "Very negative" and/or "Very positive" is optional.

A set of sentiment type identifiers, such as the primary set of sentiment type identifiers and/or the secondary set of sentiment type identifiers, may comprise at least three or at least four different sentiment type identifiers, such as five, six, seven, eight, nine, or more sentiment type identifiers. In other words, each sentiment or sentiment type may have a corresponding ST_ID_1_$i$. For example, the first primary sentiment metric SM_1_1 may comprise a first primary sentiment type identifier ST_ID_1_1 indicative of or corresponding to the primary sentiment state or the first speaker state being "positive".

A first sentiment metric SM_1_$i$ may comprise a sentiment level, also denoted SL_1_$i$, i=1, 2, . . . , O, where O is the number of sentiment levels. In other words, determining SM_1_$i$ may comprise determining SL_1_$i$, e.g. determining SM_1_1 may comprise determining a first primary sentiment level SL_1_1. A sentiment level SL_1_$i$ may indicate a level of the i'th sentiment type. In other words, SL_1_$i$ may indicate a degree of the i'th sentiment type. For example, when ST_ID_1_1 corresponds to the first speaker state "positive", a first primary sentiment level SL_1_1 may be indicative of or correspond to a degree of the sentiment "positive", e.g. at a scale, e.g. from 0 to 1 or from 1 to 10, or selected from "low", "medium", and "high". In other words, a sentiment level of a sentiment metric may be on a scale, e.g. from 0 to 1 or from 1 to 10. In other words, determining whether the first voice data satisfies a first training criterion may comprise determining whether the first sentiment level SL_1_$i$ satisfies the first training criterion, e.g. whether the first primary sentiment level satisfies the first training criterion. For example, the first training criterion may comprise a threshold for the first sentiment level SL_1_$i$ of the speaker state where the first speaker would need training. For example, the threshold for the first sentiment level SL_1_$i$ may have to be above 5 for the first voice data to satisfy the first training criterion.

A first sentiment metric SM_1_$i$ may comprise a confidence score, respectively denoted SCS_1_$i$, i=1, 2, . . . , P, where P is the number of confidence scores. In other words, determining SM_1_$i$ may comprise determining a first confidence score SCS_1_i, e.g. determining first primary sentiment metric SM_1_1 may comprise determining a first primary confidence score SCS_1_1. A confidence score of a sentiment metric may be indicative of a score or a probability of the determined sentiment metric, e.g. sentiment type identifier and/or sentiment level, being correct, e.g. the sentiment state or sentiment type (as identified by the sentiment type identifier of the sentiment metric) being correct. For example, SCS_1_1=0.88 may be indicative of a probability of 88% that the determined ST_ID_1_1, e.g. being "positive", is correct. In other words, determining whether the first voice data satisfies a first training criterion may comprise determining whether the first confidence score SCS_1_i satisfies the first training criterion, e.g. whether the first primary confidence score satisfies the first training criterion. For example, the first training criterion may comprise a threshold for the first confidence score SCS_1_i of the speaker state where the first speaker would need training. For example, the threshold for the first confidence score SCS_1_i may have to be above 0.6 for the first voice data to satisfy the first training criterion.

Determining one or more first sentiment metrics indicative of a first speaker state may comprise extracting one or more speaker features from the first audio signal, e.g. wherein the one or more first sentiment metrics are based on the one or more speaker features. The one or more speaker features may comprise paralinguistic features. The one or more speaker features may for example comprise a speaker tone feature, a speaker intonation feature, a speaker power or volume feature, a speaker pitch feature, a speaker voice quality feature, a linguistic feature, an acoustic feature, and/or a speaker spectral band energy feature. A spectral band energy feature may comprise individual bins of spectrograms indicating a signal energy level at a given frequency.

A linguistic feature may comprise specific sentiment related words such as positive and/or negative words. The linguistic feature may be determined based on a text transcript of the audio signal. The text transcript may be obtained by human annotators or using an automatic speech recognition (speech to text) algorithm or service. The linguistic feature may comprise an embedding feature by a deep neural network (e.g. a BERT transformer network or other sequence-to-sequence autoencoders).

In one or more exemplary methods, the one or more first sentiment metrics may be determined based on a machine learning, ML, model, such as an output of a ML model. The inputs to the ML model may be speaker features or the audio signal itself. A ML model may comprise a Linear Regression Model, a Support-Vector-Machine, a Decision Tree Classifier (e.g. Random Forest, XGBoost), a Gaussian Mixture Model, a Hidden Markov Model, and/or a Neural Network. A Neural Network may for example comprise one or more of a linear feed forward layer, a convolutional layer, a recurrent layer, and an attention layer. A ML model may comprise a weighting of one or more speaker features. For example, the ML model may map e.g. a speaker intonation and/or a voice quality to a sentiment metric/type, a sentiment level, and/or a sentiment confidence score. A ML model may comprise parameters in the range of 100000 parameters to 1000000 parameters, e.g. 500000 to 1000000 parameters. A ML model may comprise layers in the range of 5 layers to 20 layers, e.g. 10 layers to 15 layers.

Example of known ML models may be: "www.net/publication/222431 291_Emotional_speech_recognition_Resource s_features_and_methods", "https://mediatum.ub.tum.de/doc/1523509/1523509.pdf", and "https://www.researchgate.net/publication/319565810_End-to-end_learning_for_dimensional_emotion_recognition_from_physiological_signals".

For example, a sentiment metric may be derived from a speaker intonation metric, also denoted S, which may be a sum of the normalised variance of fundamental frequency F0/pitch (such as range adapted from 0 to 1 by multiplication with a factor determined on the audio input, such as training audio input, as the inverse of the range of F0 variance of the training data of the ML model). For example, a sentiment metric may be derived from a speaker intonation metric S, which may be the normalised (to range 0-1) variance of the signal intensity. To determine the sentiment "aroused" and the sentiment "non-aroused", for example, a threshold of e.g. 1.0 can be applied to S, where aroused is detected when S above or equals to 1.0 and non-aroused is detected for S below 1.0. Further, a sentiment level may be determined or obtained for the sentiment "aroused" or "non-aroused", e.g. in the range 0-1, where S may be divided by two (e.g. the number of speaker features that are part of the sum). Further, a sentiment confidence score may be determined or obtained based on the absolute value of the numeric difference of the normalised F0 variance and/or the normalised signal intensity variance.

A ML model may be trained based on e.g. recording of calls, where a validator or supervisor, such as a psychologist and/or human supervisor, have assigned sentiment identifiers/labels for a sentiment metric, e.g. based on their own subjective best effort judgement, and/or speaker feature labels for a speaker feature. A speaker feature may be determined algorithmically via signal processing algorithms and/or as an output of another ML model. The one or more first sentiment metrics may be inferred by the ML model. An input to the ML model may comprise one or more of an acoustic features, such as a loudness and/or pitch feature. A tone feature may be determined with a ML model, and may for example be a negative tone or a positive tone. Further an input to the ML model may comprise a spectrogram, a latent (hidden layer activations) representation of a (deep) neural network. An input to the ML model may comprise a static feature vector ("fingerprint"), such as a mean, a variance, a slope, peak distances, modulation spectra. An input to the ML model may comprise frame-wise (low-level) acoustic features such as a pitch of the voice, an energy level, spectral parameters (mel-frequency cepstrum, MFCC; e.g. logMelSpec), spectral statistics (slope, roll-off-points), speech spectral envelope characteristics (e.g. formants, harmonics, ratios of harmonics and formants), and/or voice quality measures like harmonic to noise ratio, HNR, Jitter, and/or Shimmer.

In one or more exemplary methods, the one or more first sentiment metrics SM_1_i includes a first secondary sentiment metric also denoted SM_1_2, indicative of a secondary sentiment state of the first speaker.

The secondary sentiment state may be different from the primary sentiment state. In other words, SM_1_2 may be indicative of a secondary emotion of the first speaker. SM_1_2 may be a less dominating sentiment state than the primary sentiment state and/or a second sentiment state in time of the first speaker. The secondary sentiment state may be one of disappointed, bored, afraid, sad, negative, dissatisfied, angry, surprised, worried, wondering, not understanding, thinking, neutral, positive, very positive, glad, friendly, confident, excited, pleased, satisfied, aroused, content, relaxed, energetic, enthusiastic, and happy.

In one or more exemplary methods/systems, the secondary sentiment state of the first speaker may be selected from a secondary set of sentiment states.

A first sentiment metric $SM\_1\_i$ may comprise a first sentiment type identifier, also denoted $ST\_ID\_1\_i$, where i is an index. In other words, determining one or more first sentiment metrics $SM\_1\_i$ may comprise determining a first sentiment type identifier $ST\_ID\_1\_i$, e.g. a first secondary sentiment type identifier $ST\_ID\_1\_2$ of the first secondary sentiment metric $SM\_1\_2$. A sentiment type identifier is indicative of a sentiment state of a speaker.

A sentiment type identifier may for example be a label, a number or value, such as an integer, corresponding to a specific sentiment (state), a sentiment type and/or a sentiment class. For example, $ST\_ID\_1\_i$ may respectively be selected from the same or different sets of sentiment type identifiers. For example, $ST\_ID\_1\_2$ may be selected from a secondary set of sentiment type identifiers.

In one or more exemplary methods, the first secondary sentiment metric $SM\_1\_2$ comprises a first secondary sentiment type identifier $ST\_ID\_1\_2$ selected from a secondary set of sentiment type identifiers $ST\_ID\_SET\_2$, where $ST\_ID\_SET\_2$ comprises a plurality of sentiment type identifiers, e.g. including at least three, four, five or more sentiment type identifiers.

In one or more exemplary methods, the secondary set of sentiment type identifiers $ST\_ID\_SET\_2$ is given by:

$ST\_ID\_SET\_2=\{1,2,3,4,5\}$, where "1" is indicative of a sentiment, such as "Very negative", "2" is indicative of a sentiment, such as "Negative", "3" is indicative of a sentiment, such as "Neutral", optional "4" is indicative of a sentiment, such as "Positive", and optional "5" is indicative of a sentiment, such as "Very positive".

In one or more exemplary methods, the secondary set of sentiment type identifiers $ST\_ID\_SET\_2$ is given by:

$ST\_ID\_SET\_2=\{$"Very negative","Negative","Neutral","Positive","Very positive"$\}$, e.g. where "Very negative" and/or "Very positive" is optional.

A set of sentiment type identifiers, such as the secondary set of sentiment type identifiers and/or the secondary set of sentiment type identifiers, may comprise at least three or at least four different sentiment type identifiers, such as five, six, seven, eight, nine, or more sentiment type identifiers. In other words, each sentiment or sentiment type may have a corresponding $ST\_ID\_1\_i$. For example, the first secondary sentiment metric $SM\_1\_2$ may comprise a first secondary sentiment type identifier $ST\_ID\_1\_2$ indicative of or corresponding to the secondary sentiment state or the first speaker state being "positive".

A first sentiment metric $SM\_1\_i$ may comprise a sentiment level, also denoted $SL\_1\_i$, i=1, 2, ..., O, where O is the number of sentiment levels. In other words, determining $SM\_1\_i$ may comprise determining $SL\_1\_i$, e.g. determining $SM\_1\_2$ may comprise determining a first secondary sentiment level $SL\_1\_2$. A sentiment level $SL\_1\_i$ may indicate a level of the i'th sentiment type. In other words, $SL\_1\_i$ may indicate a degree of the i'th sentiment type. For example, when $ST\_ID\_1\_2$ corresponds to the first speaker state "positive", a first secondary sentiment level $SL\_1\_2$ may be indicative of or correspond to a degree of the sentiment "positive", e.g. at a scale, e.g. from 0 to 1 or from 1 to 10, or selected from "low", "medium", and "high". In other words, a sentiment level of a sentiment metric may be on a scale, e.g. from 0 to 1 or from 1 to 10.

A first sentiment metric $SM\_1\_i$ may comprise a confidence score, respectively denoted $SCS\_1\_i$, i=1, 2, ..., P, where P is the number of confidence scores. In other words, determining $SM\_1\_i$ may comprise determining a first confidence score $SCS\_1\_i$, e.g. determining first secondary sentiment metric $SM\_1\_2$ may comprise determining a first secondary confidence score $SCS\_1\_2$. A confidence score of a sentiment metric may be indicative of a score or a probability of the determined sentiment metric, e.g. sentiment type identifier and/or sentiment level, being correct, e.g. the sentiment state or sentiment type (as identified by the sentiment type identifier of the sentiment metric) being correct. For example, $SCS\_1\_2=0.88$ may be indicative of a probability of 88% that the determined $ST\_ID\_1\_2$, e.g. being "positive", is correct.

In one or more exemplary methods, the first secondary speaker metric data $SPMD\_1\_2$ is tone metric data, also denoted TMD. The tone metric data may comprise speaking tone data. Determining first secondary speaker metric data $SPMD\_1\_2$ may comprise determining tone metric data. In one or more exemplary methods, determining first secondary speaker metric data $SPMD\_1\_2$ may comprise determining one or more first tone metrics, also denoted $TM1i$, i=1, 2, ..., m, where m is the number of first tone metrics. In other words, the tone metric data TMD may comprise one or more first tone metrics over time, e.g. over the first conversation.

A tone metric is indicative of a tone of a speaker. Tone metric data TMD may be indicative of a mean tone of a speaker over a conversation. The first speaker metric data may comprise one or more first tone parameters, e.g. comprised in the tone metric data TMD.

The one or more first tone parameters may be based on the one or more first tone metrics. For example, the tone metric data TMD may be indicative of, or comprise a first tone parameter being a mean tone of a speaker over a conversation and/or a tone outcome of a conversation (e.g. the overall tone of the speaker when the conversation is terminated). Tone metric data TMD may be indicative of a mean tone of a speaker over a conversation. Tone metric data TMD may comprise one or more speech metrics. In other words, the tone metric data may comprise one or more speech metrics e.g. interruptions, overtalks, long pauses, high or low speech rate, high or low intonation, turn or flip of a speaker (e.g. turning a customer from negative to positive or vice-versa), and/or responsiveness. The tone metric data may comprise count of events, e.g. count of one or more metrics.

In other words, determining whether the first voice data satisfies a first training criterion may comprise determining whether the tone metric data TMD satisfies the first training criterion, e.g. whether one or more first tone metrics $TM\_1\_i$ satisfy the first training criterion. For example, when it has been determined that the first speaker have had a negative speaking tone in on or more conversations, such as the last five calls, it may be determined or recommended that the first speaker performs a training session, such as the first training session.

In one or more exemplary methods, the first speaker metric data comprises first tertiary speaker metric data being appearance metric data. Determining first speaker metric data $SPMD\_1$ may comprise determining first tertiary speaker metric data, also denoted $SPMD\_1\_3$. In other words, the first speaker metric data $SPMD\_1$ may comprise first tertiary speaker metric data $SPMD\_1\_3$. Determining first tertiary speaker metric data $SPMD\_1\_3$ may comprise determining appearance metric data, also denoted AMD.

In one or more exemplary methods, determining first tertiary speaker metric data SPMD_1_3 may comprise determining one or more first appearance metrics, also denoted AM_1_i, i=1, 2, Q, where Q is the number of first appearance metrics of or associated with the first speaker. In other words, the appearance metric data AMD may comprise one or more first appearance metrics over time, e.g. over the first conversation.

An appearance metric is indicative of an appearance of a speaker. The first speaker metric data may comprise one or more first appearance parameters, e.g. comprised in the appearance metric data AMD. The one or more first appearance parameters may be based on the one or more first appearance metrics. For example, the appearance metric data AMD may be indicative of, or comprise a first appearance parameter being a mean appearance of a speaker over a conversation and/or an appearance outcome of a conversation (e.g. the overall appearance of the speaker when the conversation is terminated). Appearance metric data AMD may be indicative of a mean appearance of a speaker over a conversation. An appearance metric may comprise one or more of an appearance identifier, appearance level(s), and a confidence score, and may be indicative of an appearance of the first speaker, e.g. based on the first audio signal and/or a second audio signal. Determining one or more first appearance metrics may comprise retrieving first appearance metric(s) from a database, e.g. based on information related to the first speaker stored in the database. The one or more first appearance metrics AM_1_i may comprise one or more parameters indicative of the appearance of the first speaker. The one or more first appearance metrics AM_1_i include a first primary appearance metric, also denoted AM_1_1, indicative of a primary appearance of the first speaker and/or a first secondary appearance metric, also denoted AM_1_2, indicative of a secondary appearance of the first speaker. In one or more exemplary methods, determining whether the first voice data satisfies a first training criterion may comprise determining whether the one or more first appearance metrics AM_1_i satisfy the first training criterion, e.g. whether the first primary appearance metric AM_1_1 satisfies the first training criterion. For example, when it has been determined that the first voice of the first speaker have sounded like a 10 year old girl in one or more conversations, but in reality, the first speaker is a man of 45 years old, e.g. when comparing to actual appearance metrics stored on a database. It may then be determined or recommended that the first speaker performs a training session, such as the first training session, to improve the matching the first appearance metrics of the first voice with the actual appearance of the first speaker.

In other words, AM_1_1 may be indicative of a primary physical appearance of the first speaker. AM_1_1 may be selected from a gender metric (e.g. woman, man, or no gender), a weight metric, a height metric, an age metric, a language metric, a language capability metric, a hearing capability metric, and an understanding capability metric a dialect metric, a health metric (e.g. respiratory condition, speech deficiency, and/or speaking impairment), a personality metric (e.g. extrovert or introvert person), and an understanding capability metric (e.g. based on age metric, health metric, and/or gender metric). The understanding capability metric may for be relevant when an old person have difficulties hearing a conversation, or a foreigner who's not comfortable in the spoken language. The understanding capability metric may provide an indication to the user e.g. that he/she shall speak slower and more articulated.

A first appearance metric AM_1_i may comprise a first appearance identifier, also denoted A_ID_1_i, where I is an index of the i'th first appearance metric, i=1, 2, . . . I, where I is the number of first appearance identifiers. A first appearance identifier may be indicative of one of a gender metric, a weight metric, a height metric, an age metric, a language metric, a language capability metric, a hearing capability metric, and an understanding capability metric. In other words, determining AM_1_i may comprise determining A_ID_1_i, including a first primary appearance identifier A_ID_1_1 of a first primary appearance metric AM_1_1 and/or a first secondary appearance identifier A_ID_1_2 of a first secondary appearance metric AM_1_2.

An appearance identifier may for example be a label, a number or a value, such as an integer, corresponding to a specific appearance metric, appearance type and/or an appearance class. For example, A_ID_1_i may be chosen from a set of appearance types, e.g. including one or more of gender, height, weight, height, age, language, language capability, hearing capability, and understanding capability. The appearance metric identifier may be a label or a number that is mapped to and/or indicative of the type of appearance metric.

In one or more exemplary methods, the first primary appearance metric AM_1_1 comprises a first primary appearance identifier A_ID_1_1 optionally selected from a primary set of appearance identifiers A_ID_SET_1, where A_ID_SET_1 comprises a plurality of appearance identifiers, e.g. including at least three, four, five or more sentiment type identifiers. In one or more exemplary methods, the first primary appearance metric AM_1_1 is a gender metric, i.e. first primary metric identifier A_ID_1_1 is indicative of gender, e.g. A_ID_1_1="Gender" or A_ID_1_1=1 that can be mapped to gender via a table.

In one or more exemplary methods, the first secondary appearance metric AM_1_2 comprises a first secondary appearance identifier A_ID_1_2 optionally selected from a secondary set of appearance identifiers A_ID_SET_2, where A_ID_SET_2 comprises a plurality of appearance identifiers, e.g. including at least three, four, five or more appearance identifiers.

A set of appearance identifiers may comprise two or at least three or at least four different appearance identifiers, such as five, six, seven, eight, nine, or more appearance identifiers. For example, the first primary appearance metric AM_1_1 may comprise a first primary appearance identifier A_ID_1_1 indicative of or corresponding to the primary appearance of the first speaker, e.g. one of gender, weight, height, age, language, language capability, hearing capability, and understanding capability. For example, a first secondary appearance identifier A_ID_1_2 may be indicative of or correspond to a first second appearance of the first speaker, e.g. one of gender, weight, height, age, language, language capability, hearing capability, and understanding capability. The first secondary appearance identifier is optionally different from the first primary appearance identifier.

A first appearance metric AM_1_i may comprise an appearance level, also denoted AL_1_i, i=1, 2, . . . , R, where R is the number of appearance levels. In other words, determining AM_1_i may comprise determining AL_1_i, e.g. determining AM_1_1 may comprise determining a first primary appearance level AM_1_1. The first appearance level AL_1_i may indicate a level, value, range, or label of the appearance metric AM_1_i as indicated by the appearance identifier A_ID_1_i. In other words, a first appearance level AL_1_i may indicate a level, value, range, or label of the first appearance metric AM_1_i. For example, when A_ID_1_1 corresponds to the first primary appearance of the first speaker being "gender", a first primary appearance level AL_1_1 may be indicative of or correspond to "male", "female" or optionally "unisex". For example, when first secondary appearance identifier A_ID_1_2 corresponds to the first secondary appearance metric of the first speaker being "height", a first secondary appearance level AL_1_2 may be indicative of or correspond to "short", "medium" or "tall". For example, when first secondary appearance identifier A_ID_1_2 corresponds to the first secondary appearance of the first speaker being "height", a first secondary appearance level AL_1_2 may be indicative of or correspond to "less than 160 cm", "between 160 cm and 185 cm" or "taller than 185 cm". In other words, determining whether the first voice data satisfies a first training criterion may comprise determining whether the first appearance level AL_1_i satisfies the first training criterion, e.g. whether the first primary appearance level satisfies the first training criterion. For example, the first training criterion may comprise a threshold for the first appearance level AL_1_i of the speaker state where the first speaker would need training.

For example, when a first appearance identifier, such as first tertiary appearance identifier A_ID_1_3, corresponds to a first appearance metric, such as first tertiary appearance metric AM_1_3, of the first speaker being "age", a first tertiary appearance level AL_1_3 may be indicative of or correspond to an age range such as "younger than 20 years", "20-40 years", "40-60 years", or "older than 60 years" or an age label, such as "young", "mid-aged" or "old".

A first appearance metric AM_1_i may comprise a confidence score, also denoted ACS_1_i, i=1, 2, ..., S, where S is the number of confidence scores. In other words, determining a first appearance metric AM_1_i may comprise determining a first appearance confidence score ACS_1_i, e.g. determining a first primary appearance metric AM_1_1 may comprise determining a first primary appearance confidence score ACS_1_1. A first appearance confidence score ACS_1_i of an appearance metric AM_1_i may be indicative a score or a probability of the determined first appearance metric AM_1_i, such as first appearance level AL_1_i, being correct, e.g. the appearance metric or appearance level being correct. For example, ACS_1_1=0.95 may be indicative of a probability of 95% that a determined AL_1_1 being "male" is correct. In other words, determining whether the first voice data satisfies a first training criterion may comprise determining whether the first confidence score ACS_1_i satisfies the first training criterion, e.g. whether the first primary confidence score satisfies the first training criterion. For example, the first training criterion may comprise a threshold for the first confidence score ACS_1_i of the speaker state where the first speaker would need training. For example, the threshold for the first confidence score ACS_1_i may have to be above 0.6 for the first voice data to satisfy the first training criterion.

Determining one or more first appearance metrics indicative of a first speaker may comprise extracting one or more speaker appearance features from the first audio signal. The one or more speaker appearance features may for example comprise a speaker tone feature, a speaker intonation feature, a speaker power feature, a speaker pitch feature, a speaker voice quality feature, a speaker rate feature, a linguistic feature, an acoustic feature, and/or a speaker spectral band energy feature.

A spectral band energy feature may comprise individual bins of spectrograms indicating a signal energy level at a given frequency.

A linguistic feature may comprise specific appearance related words such as positive and/or negative words. The linguistic feature may be determined based on a text transcript of the audio signal. The text transcript may be obtained by human annotators or using an automatic speech recognition (speech to text) algorithm or service. The linguistic feature may comprise an embedding feature by a deep neural network (e.g. a BERT transformer network or other sequence-to-sequence autoencoders).

In one or more exemplary methods, the one or more first appearance metrics may be determined based on a machine learning, ML, model, such as an output of a ML model.

The one or more first appearance metrics may be inferred by the ML model. A ML model may comprise a Linear Regression Model, a Support-Vector-Machine, a Decision Tree Classifier (e.g. Random Forest, XGBoost), a Gaussian Mixture Model, a Hidden Markov Model, and/or a Neural Network. A Neural Network may for example comprise one or more of a linear feed forward layer, a convolutional layer, a recurrent layer, and an attention layer. A ML model may comprise a weighting of one or more speaker features. For example, the ML model may map e.g. a speaker intonation and/or a voice quality to a sentiment metric/type, a sentiment level, and/or a sentiment confidence score. A ML model may comprise parameters in the range of 100000 parameters to 1000000 parameters, e.g. 500000 to 1000000 parameters. A ML model may comprise layers in the range of 5 layers to 20 layers, e.g. 10 layers to 15 layers.

A ML model may be trained based on e.g. recording of calls, where a validator or supervisor, such as a human supervisor, have assigned sentiment identifiers/labels for a sentiment metric, and/or speaker feature labels for a speaker feature. A speaker feature may be determined algorithmically via signal processing algorithms. The one or more first appearance metrics may be inferred by the ML model. An input to the ML model may comprise audio data, such as audio data stored on a database of known audio data matching one or more appearance metrics, such as labels of appearance. A label of appearance may comprise a label assigned by a human and/or a ground truth, such as an age or a height from a passport or social registry. For example, the audio data input may comprise recording of calls, television shows, and/or movie actors or the like.

An input to the ML model may comprise one or more of an acoustic features, such as a tone feature. A tone feature may for example be a negative tone or a positive tone. Further an input to the ML model may comprise a spectrogram, a latent (hidden layer activations) representation of a (deep) neural network. An input to the ML model may comprise a static feature vector ("fingerprint"), such as a mean, a variance, a slope, peak distances, modulation spectra. An input to the ML model may comprise frame-wise (low-level) acoustic features such as a pitch of the voice, an energy level, spectral parameters (mel-frequency cepstrum, MFCC; e.g. logMelSpec), spectral statistics (slope, roll-off-points), speech spectral envelope characteristics (e.g. formants, harmonics, ratios of harmonics and formants), and/or voice quality measures like harmonic to noise ratio, HNR, Jitter, and/or Shimmer. For example, an acoustic feature related to one or more appearance metrics, such as physical appearance, may comprise ratios of vowel formants which correlate with vocal tract length. For example, acoustic features may relate to one or more appearance metrics such as body size, voice quality features, e.g. HNR, Jitter and/or Shimmer which correlate with age (e.g. more breathiness, more Jitter for higher age), pitch may correlate with gender (e.g. males may have a pitch below 150 Hz and females may have a pitch above 150 Hz). Further, acoustic features may for example comprise a phoneme inventory/histogram for language and dialect features, and/or average spectral envelope features e.g. for age, and/or gender.

In one or more exemplary methods, the one or more first appearance metrics AM_1_$i$ includes a first secondary appearance metric, also denoted AM_1_2, indicative of a secondary appearance of the first speaker.

In one or more exemplary methods, the first secondary appearance metric AM_1_2 comprises a first secondary appearance identifier A_ID_1_2 optionally selected from a secondary set of appearance identifiers A_ID_SET_1, where A_ID_SET_1 comprises a plurality of appearance identifiers, e.g. including at least three, four, five or more sentiment type identifiers. In one or more exemplary methods, the first secondary appearance metric AM_1_2 is a gender metric, i.e. first secondary metric identifier A_ID_1_2 is indicative of gender, e.g. A_ID_1_2="Gender" or A_ID_1_2=1 that can be mapped to gender via a table.

In one or more exemplary methods, the first secondary appearance metric AM_1_2 comprises a first secondary appearance identifier A_ID_1_2 optionally selected from a secondary set of appearance identifiers A_ID_SET_2, where A_ID_SET_2 comprises a plurality of appearance identifiers, e.g. including at least three, four, five or more appearance identifiers A set of appearance identifiers may comprise two or at least three or at least four different appearance identifiers, such as five, six, seven, eight, nine, or more appearance identifiers. For example, the first secondary appearance metric AM_1_2 may comprise a first secondary appearance identifier A_ID_1_2 indicative of or corresponding to the secondary appearance of the first speaker, e.g. one of gender, weight, height, age, language, language capability, hearing capability, and understanding capability. For example, a first secondary appearance identifier A_ID_1_2 may be indicative of or correspond to a first second appearance of the first speaker, e.g. one of gender, weight, height, age, language, language capability, hearing capability, and understanding capability a dialect metric, a health metric (e.g. respiratory condition, speech deficiency, and/or speaking impairment), a personality metric (e.g. extrovert or introvert person), and an understanding capability metric (e.g. based on age metric, health metric, and/or gender metric). The understanding capability metric may for be relevant when an old person have difficulties hearing a conversation, or a foreigner who's not comfortable in the spoken language. The understanding capability metric may provide an indication to the user e.g. that he/she shall speak slower and more articulated. The first secondary appearance identifier is optionally different from the first secondary appearance identifier.

A first appearance metric AM_1_$i$ may comprise an appearance level, also denoted AL_1_$i$, i=1, 2, . . . , R, where R is the number of appearance levels. In other words, determining AM_1_$i$ may comprise determining AL_1_$i$, e.g. determining AM_1_2 may comprise determining a first secondary appearance level AM_1_2. The first appearance level AL_1_$i$ may indicate a level, value, range, or label of the appearance metric AM_1_$i$ as indicated by the appearance identifier A_ID_1_$i$. In other words, a first appearance level AL_1_$i$ may indicate a level, value, range, or label of the first appearance metric AM_1_$i$. For example, when A_ID_1_2 corresponds to the first secondary appearance of the first speaker being "gender", a first secondary appearance level AL_1_2 may be indicative of or correspond to "male", "female" or optionally "unisex". For example, when first secondary appearance identifier A_ID_1_2 corresponds to the first secondary appearance metric of the first speaker being "height", a first secondary appearance level AL_1_2 may be indicative of or correspond to "short", "medium" or "tall". For example, when first secondary appearance identifier A_ID_1_2 corresponds to the first secondary appearance of the first speaker being "height", a first secondary appearance level AL_1_2 may be indicative of or correspond to "less than 160 cm", "between 160 cm and 185 cm" or "taller than 185 cm".

For example, when a first appearance identifier, such as first tertiary appearance identifier A_ID_1_3, corresponds to a first appearance metric, such as first tertiary appearance metric AM_1_3, of the first speaker being "age", a first tertiary appearance level AL_1_3 may be indicative of or correspond to an age range such as "younger than 20 years", "20-40 years", "40-60 years", or "older than 60 years" or an age label, such as "young", "mid-aged" or "old".

A first appearance metric AM_1_$i$ may comprise a confidence score, also denoted ACS_1_$i$, i=1, 2, . . . , S, where S is the number of confidence scores. In other words, determining a first appearance metric AM_1_$i$ may comprise determining a first appearance confidence score ACS_1_$i$, e.g. determining a first secondary appearance metric AM_1_2 may comprise determining a first secondary appearance confidence score ACS_1_2. A first appearance confidence score ACS_1_$i$ of an appearance metric AM_1_$i$ may be indicative a score or a probability of the determined first appearance metric AM_1_$i$, such as first appearance level AL_1_$i$, being correct, e.g. the appearance metric or appearance level being correct. For example, ACS_1_2=0.95 may be indicative of a probability of 95% that a determined AL_1_2 being "male" is correct.

The one or more first sentiment metrics and the one or more first appearance metrics may be part of first speaker metric data. First speaker metric data may also be denoted agent metric data and/or caller metric data.

In one or more exemplary methods, obtaining the voice data comprises determining deficiency data, also denoted DD, indicative of one or more deficiencies of the voice.

In one or more exemplary methods, obtaining the first voice data VD_1 comprises determining first deficiency data, also denoted DD_1, indicative of one or more deficiencies of the first voice. In other words, obtaining the first voice data may comprise determining whether the first voice data, e.g. the first voice, comprises one or more deficiencies. A deficiency may be defined as voice data, such as a speaker metric and/or a voice metric where the first speaker/user is outside of a predetermined or defined range, threshold, and/or value. A deficiency may also be determined in term of an event where the speaker/user did not perform as required or defined.

In one or more exemplary methods, determining whether the first voice data satisfies a first training criterion comprises determining first deficiency data indicative of one or more deficiencies of the first voice and determining whether the first deficiency data satisfies a first training criterion, e.g. if the first deficiency data meets one or more thresholds. Obtaining first deficiency data may comprise identifying one or more speaker metrics and/or voice metrics where the first speaker performs below a defined standard.

In one or more exemplary methods, the deficiency data comprises one or more of a speaking tone deficiency, a speech trait deficiency, and a vocal trait deficiency. The first deficiency data may comprise one or more of a speaking tone deficiency, a speech trait deficiency, and a vocal trait deficiency of the first speaker. A speaking tone deficiency may for example comprise a negative speaking tone, a dissatisfied speaking tone, a worried tone, a bored tone, and/or an afraid tone. A speech trait deficiency may for example comprise a lack of enthusiasm, a lack of friendliness, a lack of empathy, and/or a lack of professionalism of the first speaker, e.g. in the first voice. A vocal trait deficiency may for example comprise a monotonous voice, an unpleasant speaking rate, an unpleasant variation in intonation, and/or an unclear pronunciation.

In one or more exemplary methods, obtaining the voice data comprises determining strength data, also denoted SD, indicative of one or more strengths of the voice.

In one or more exemplary methods, obtaining the first voice data VD_1 comprises determining first strength data, also denoted SD_1, indicative of one or more strengths of the first voice. In other words, obtaining the first voice data may comprise determining whether the first voice data, e.g. the first voice, comprises one or more strengths.

In one or more exemplary methods, determining whether the first voice data satisfies a first training criterion, comprises determining first strength data indicative of one or more strengths of the first voice. Obtaining first strength data may comprise identifying one or more speaker metrics and/or voice metrics where the first speaker performs above a defined standard.

In one or more exemplary methods, the strength data comprises one or more of a speaking tone strength, a speech trait strength, and a vocal trait strength. The first strength data may comprise one or more of a speaking tone strength, a speech trait strength, and a vocal trait strength of the first speaker. A speaking tone strength may for example comprise a positive speaking tone, a satisfied speaking tone, a service-minded tone, an enthusiastic tone, and/or a helpful tone. A speech trait strength may for example comprise enthusiasm, friendliness, and/or professionalism of the first speaker, e.g. in the first voice. A vocal trait strength may for example comprise a changing voice, a pleasant speaking rate, and/or a clear pronunciation.

The first training information may be based on the deficiency data and/or the strength data.

In other words, the training information may provide a feedback to the user/first speaker about his/her voice parameters/characteristics, such as related to the deficiency data and/or the strength data. The first training information may provide a feedback report, such as a personalized feedback report to the user/speaker. Outputting the first training information may generating a first feedback report. The first training information may provide a summarized feedback report, where the one or more deficiencies and/or strengths of the first speaker/user are highlighted. The first training information may comprise a benchmarking of the first voice data, e.g. in relation to one or more other users of the company where the first speaker works and/or of other users of the voice coaching system. The first training information based on the deficiency data may provide feedback to the first speaker on what voice parameters/characteristics to improve. The first training information based on the strength data may provide positive feedback to the first speaker, e.g. to motivate the first speaker either by showing an improvement over time of voice parameters/characteristics and/or one or more strengths in one or more voice parameters/characteristics.

The method comprises determining whether the voice data VD satisfies a training criterion, also denoted TC. The method may comprise determining whether the first voice data VD_1 satisfies a first training criterion, also denoted TC_1. The method may comprise determining whether the first voice data satisfies or fulfills the first training criterion.

The first training criterion may be indicative of a threshold value, such as a first threshold value, that the first voice data satisfies the first training criterion or not. The first training criterion may be indicative of whether the user/speaker shall be coached or trained for one or more deficiencies of the first voice or not. In other words, the method comprises determining whether a coaching and/or training of the first speaker/user, such as one or more training sessions, should be performed in view of the determined first voice data. For example, when the first voice data satisfies the training criterion, there may be a probability that the user needs to improve on one or more deficiencies of his/her voice, e.g. the first voice of the first speaker. The first training criterion may comprise one or more parameters that the first voice data, e.g. the first speaker metric data, may be compared to. For example, the first training criterion may comprise a first speaking tone criterion/parameter, a first speech trait criterion/parameter, a first vocal trait criterion/parameter, and/or a first time parameter/criterion (for example a time limit before the first speaker has to perform the first training session). In other words, the first training criterion may comprise one or more conditions to be satisfied by the first voice data.

In one or more exemplary methods, determining whether the first voice data satisfies a first training criterion comprises determining whether the first voice data is above, equal to, or below a first threshold or within a first range.

Determining that the first voice data satisfies the first training criterion may be understood as the first voice data being above the first threshold, equal to and/or within the first range. For example, when the first voice data is equal to the first threshold, it may still be determined that the first voice data satisfies the first training criterion for precautionary reasons. The first training criterion may be based on a standard speaker score. Determining whether the first voice data satisfies the first training criterion may comprise determining whether a first speaker score of the first voice data satisfies the standard speaker score.

In one or more exemplary methods, the training criterion, e.g. the first training criterion, is based on the speaker metric data, e.g. the first speaker metric data. The first training criterion may be determined based one or more first speaker metrics. For example, when the first speaker metric data comprises a first tone metric, the first training criterion may comprise the first tone metric. The first tone metric may then be compared to a standard tone metric of the first training criterion and/or a threshold for the tone metric.

In one or more exemplary methods, the training criterion is based on a standard. In one or more exemplary methods, the first training criterion is based on a first standard. The first training criterion may be determined in accordance with the first standard. The first standard may comprise one or more standard values or model values, such as a golden standard. In other words, the first standard may comprise one or more standard values indicative of a standard or model performance of a speaker, e.g. of the voice of a speaker, for one or more voice metrics. The first standard may comprise one or more standard values indicative of an optimal performance, for one or more voice metrics. For example, the first standard may comprise a standard tone metric, a standard speech trait metric, and/or a standard vocal trait metric. The first standard may comprise one or more parameters defined e.g. by a company where the first speaker works, a manager, and/or the first speaker/user himself. In other words, the training sessions may be repeated until the standard is satisfied/met by the first voice data. The first standard may be defined as a direct goal to first voice data, e.g. first speaker metrics and/or voice metrics. For example, the first voice data may satisfy a tone score threshold, an intonation variation minimum level, a speaking rate range, and/or a volume range. Alternatively, or additionally, the first standard may be defined as an indirect goal, e.g. in form of a company KPI, call center KPI, such as to improve customer satisfaction scores (CSAT), increase sales numbers, and/or reduce call handling times. For example, when the first standard is defined as an indirect goal, the first speaker metrics may be inferred from a statistical or machine learning model built on the obtained/analyzed audio data, e.g. of a plurality of users/speakers and/or customers across a company. Such a model may predict the relation between the defined KPIs, and the voice data obtained for one or more users/speakers. For example, speaking at a certain speed range may increase CSAT in most cases. In one or more exemplary methods, the first training session may be determined based on a training model, such as a machine learning model. The training model may for example target one or more voice metrics and/or speaker metrics to optimize on.

The method comprises determining a training session, also denoted TS, in accordance with determining that the voice data satisfies the training criterion. The training session TS may be determined based on the audio data AD, the voice data VD, and/or the speaker metric data SPMD. The training session may comprise one or more vocal training modules. The method may comprise determining a first training session TS_1 in accordance with determining that the first voice data satisfies the first training criterion. The first training session TS_1 may be determined based on the first audio data AD_1, the first voice data VD_1, and/or the first speaker metric data SPMD_1. The first training session may be determined based on a first speaker profile, e.g. a first speaker profile determined based on the first audio data, such as the first voice data. The first speaker profile may comprise one or more parameters indicative of the first voice of the first speaker. The first training session may be adapted depending on the metrics or competences that the first speaker has to improve, e.g. depending on the first training criterion and/or the first speaker metric data. The first training session may comprise one or more exercises for improving one or more parameters and/or deficiencies of the first voice/first speaker. The first training session may be based on the first training criterion, e.g. the first training session comprising one or more exercises for improving one or more parameters satisfying the first training criterion. The training session may comprise one or more training session types, e.g. depending the voice parameters/metrics/competences to be trained. The first training session may comprise one or more exercises based on a prioritization of which voice parameters/metrics/competences the first speaker shall improve first. The first training session may comprise one or more voice training/coaching exercises. The first training session may be selected from a list of training sessions, e.g. the list of training sessions comprising one or more standard training sessions. A training session may comprise a training session configuration or layout. In one or more exemplary methods, the first training session may be a personalized training session for the first speaker. For some speakers/users a first speaker metric may be compensated by another speaker metric. For example, for some speakers/users the speaking rate may have a direct impact on CSAT with a low performance. For other speakers/users the speaking rate may be compensated by another speaker metric. For example, a user/speaker speaking very fast or very slow may still have a good performance on CSAT. In one or more exemplary methods, the first training session may be determined based on a training model, such as a machine learning model. The training model may for example make use of reinforced learning. The training model may for example make use of reinforced learning based on finding personalized target voice metrics and/or speaker metrics.

In one or more exemplary methods, the training session may comprise a training scheme. In other words, the first training session may comprise a first training scheme. A training scheme may comprise a training content, a training complexity/level, a training frequency, a training time, follow-up plan/scheme, and/or a training duration. The training duration of the first training session may be in the range from 2 min to 45 min, such as 10 min, 15 min, 20 min, or 30 min. A training scheme may be based on a user's historical performance, experience, change in role/function, e.g. moving to a different team, and/or previous completion of exercises.

In one or more exemplary methods, determining the training session comprises determining a training representation, also denoted TR, e.g. based on the audio data AD, the voice data VD, the speaker metric data SPMD, the deficiency data and/or the standard. In other words, the method comprises including the training representation TR in the training session TR. The training representation may be indicative of one or more exercises e.g. to be performed by a speaker. In one or more exemplary methods, determining the first training session comprises determining a first training representation TR_1, e.g. based on the first audio data, the first voice data, the first speaker metric data, the first deficiency data and/or the first standard. In other words, the method comprises including the first training representation TR_1 in the training session TR_1. Determining the first training representation TR_1 may comprise determining one or more exercise representations, e.g. comprising a first exercise representation, also denoted ER_1. The training representation may comprise one or more training representation type, e.g. depending the voice parameters/metrics/competences to be trained. In other words, the first training representation may comprise a first training session type, e.g. depending the voice parameters/metrics/competences to be trained by the first speaker. For example, the first training representation may be based on the determined first deficiency data indicative of one or more deficiencies of the first voice of the first speaker. The first training representation may comprise one or more exercises selected from a list of exercises, e.g. obtained from a database of the server device. The first training representation may be selected from a list of training representations, e.g. the list of training representations comprising one or more standard training representations. A training representation may comprise a training representation configuration or layout. The first training representation may comprise sound representation, such as auditory feedback and/or audio icons.

In one or more exemplary methods, the training session TS comprises one or more exercises, also denoted $EX\_i$, i=1, 2, . . . X, where X is the number of exercises. The one or more exercises may be representative of the deficiency data DD. In one or more exemplary methods, the first training session TS_1 comprises one or more first exercises, also denoted $EX\_1\_i$, i=1, 2, . . . x, where x is the number of first exercises. An exercise may comprise a duration, such as 10 min, 15 min, 20 min, or 30 min. An exercise may prompt the first speaker/user to speak a phrase or sentence with certain voice metrics, such as vocal characteristics that may be targeted by the first training session and/or the exercise itself. The first speaker may be recorded while performing the exercise, such as while speaking the phrase or sentence, for obtaining audio data/voice data. The audio data/voice data from the exercise may be analysed and it may be determined whether the audio data/voice data satisfies a training criterion. Depending on the outcome of the determination of whether the audio data/voice data satisfies the training criterion, the method may proceed to another exercise, repeat the same exercise, or stop. In other words, determining the first training session may comprise determining one or more first exercises and including the one or more first exercises in the first training session. The one or more first exercises EX_1_i may be representative of the first deficiency data DD_1. The one or more first exercises EX_1_i may be representative of the first audio data AD, the first voice data VD, and/or the first speaker metric data SPMD. In other words, the one or more first exercises may be configured to train the first voice of the first speaker to remedy or improve at least some of the one or more deficiencies of the first voice. The one or more first exercises EX_1_i may be configured to train the first voice of the first speaker to improve one or more metrics/parameters, such as voice metrics/parameters of the first voice of the first speaker, e.g. a speaking tone, a speech trait, and/or a vocal trait of the first voice of the first speaker. The one or more first exercises EX_1_i may comprise exercises for improving understanding of voice, speech, and/or tone.

In one or more exemplary methods, the one or more first exercises comprise one or more of a speaking tone exercise, a speech trait exercise, and a vocal trait exercise. In other words, determining one or more first exercises may comprise determining one or more of a speaking tone exercise, a speech trait exercise, and a vocal trait exercise. The speaking tone exercise may be an exercise for improving a speaking tone deficiency, e.g. of the first voice of the first speaker. The speech trait exercise may be an exercise for improving a speech trait deficiency of the first voice of the first speaker. The vocal trait exercise may be an exercise for improving a vocal trait deficiency of the first voice of the first speaker.

The method comprises outputting, via the interface of the voice coaching device, first training information indicative of the first training session. In other words, outputting the first training information may comprise outputting the first training session via the interface of the voice coaching device. Outputting the first training information may comprise displaying a first user interface indicative of the first training information. A user interface may comprise one or more, such as a plurality of, user interface objects. Outputting the first training information may indicate to the first speaker/user that the first training session is ready to be performed, e.g. on the voice coaching device. For example, the first user interface may comprise one or more first user interface objects, such as a first primary user interface object and/or a first secondary user interface object. A user interface object may refer herein to a graphical representation of an object that is displayed on an interface of the voice coaching device, such as a display. The user interface object may be user-interactive, or selectable by a user input. For example, an image (e.g., icon), a button, and text (e.g., hyperlink) each optionally constituting a user interface object. The user interface object may form part of a widget. A widget may be seen as a mini-application that may be used by the user.

In one or more exemplary methods, the first training information is a recommendation to perform the first training session, and wherein outputting first training information comprises displaying a training user interface object on a display of the interface. The training user interface object may be indicative of the first training session, the first training representation, and/or the one or more first exercises. The training user interface object may be comprised in the first user interface indicative of the first training information. The training user interface object may comprise one or more of an image (e.g., icon), a button, and text (e.g., hyperlink), which may direct the user/first speaker to the first training session for being trained.

The first training information may comprise a notification to the user/first speaker to be trained, such as an email, an SMS, and/or a calendar invite, to perform and/or be notified that the first training session is available for him/her. In other words, the first training information may comprise populating a calendar, such as a dedicated training calendar and/or a calendar of the user/first speaker, with the first training session. The first training information may comprise populating a list of tasks for the user/first speaker, such that the user/first speaker may see the one or more training sessions that he/she has to perform.

In one or more exemplary methods, the method comprises determining that a user has performed the first training session. Determining that a user has performed the first training session may comprise to detect a termination of the performance of the first training session, e.g. a termination of the performance of one or more first exercises, such as a termination, an end, or a hold of the first training session.

In one or more exemplary methods, the method comprises obtaining second audio data, also denoted AD_2, of the first voice, e.g. in accordance with the determination that the user has performed the first training session. In other words, the second audio data may be obtained after the performance of the first training session by the first speaker/user. The description of the first audio data AD_1 may also apply to the second audio data AD_2. The obtaining of the second audio data may occur later in time than the first audio data.

In one or more exemplary methods, the method comprises obtaining second voice data, also denoted VD_2, based on the second audio data AD_2. The second voice data VD_2 may comprise data indicative of the first voice, e.g. of the first speaker. Obtaining second voice data may comprise generating second voice data of a first voice based on the second audio data. The second voice data may be second agent voice data, such as second voice data of a first user/speaker/agent of the voice coaching system. The second voice data may comprise speaker metric data, also denoted SPMD, such as second speaker metric data SPMD_2.

In one or more exemplary methods, obtaining second voice data based on the second audio data comprises determining second speaker metric data of a first speaker based on the second audio data, the second speaker metric data including second primary speaker metric data, also denoted SPMD_2_1.

In one or more exemplary methods, obtaining the second voice data comprises determining second deficiency data, DD_2, indicative of one or more deficiencies of the first voice.

The description of the first voice data VD_1, the first speaker metric data, and the first deficiency data may also respectively apply to the second voice data VD_2, the second speaker metric data, and the second deficiency data. The second voice data VD_2, the second speaker metric data, and the second deficiency data may respectively be different or correspond to the first voice data VD_1, the first speaker metric data, and the first deficiency data. The obtaining of the second voice data may occur later in time than the first voice data.

In one or more exemplary methods, the method comprises determining feedback information, also denoted FB, indicative of training session feedback based on the voice data VD.

In one or more exemplary methods, the method comprises determining first feedback information, also denoted FB_1, indicative of first training session feedback, also denoted TFB_1, based on the second voice data.

Determining the first feedback information FB_1 may comprise to determine first training session feedback based on the first training session, the second audio data, and/or the second voice data.

The first feedback information may be indicative of an outcome of the first training session. The method may comprise outputting the first feedback information e.g. via the interface of the voice coaching device. Outputting the first feedback information may comprise displaying a first user interface indicative of the first feedback information. A user interface may comprise one or more, such as a plurality of, user interface objects. For example, the first user interface may comprise one or more first user interface objects, such as a first primary user interface object and/or a first secondary user interface object. A user interface object may refer herein to a graphical representation of an object that is displayed on an interface of the voice coaching device, such as a display. The user interface object may be user-interactive, or selectable by a user input. For example, an image (e.g., icon), a button, and text (e.g., hyperlink) each optionally constituting a user interface object. The user interface object may form part of a widget. A widget may be seen as a mini-application that may be used by the user.

In one or more exemplary methods, the first feedback information is a recommendation to the user/speaker to review the first training session feedback of the performed first training session and of the second voice data. The first feedback information may comprise a notification to the user/first speaker to be trained, such as an email, an SMS, and/or a calendar invite, to review and/or be notified that the first training session feedback is available for him/her. In other words, the first feedback information may comprise populating a calendar, such as a dedicated training calendar and/or a calendar of the user/first speaker, with the first training session feedback. The first feedback information may comprise populating a list of tasks for the user/first speaker, such that the user/first speaker may see the one or more training session feedbacks that he/she have received.

The first feedback information may be based on the deficiency data and/or the strength data. The first feedback information may depend on the first training session feedback.

In other words, the training information may provide a feedback to the user/first speaker about his/her voice parameters/characteristics, such as related to the deficiency data and/or the strength data. The first feedback information based on the deficiency data may provide feedback to the first speaker on what voice parameters/characteristics to improve. The first feedback information based on the strength data may provide positive feedback to the first speaker, e.g. to motivate and increase the awareness of the first speaker either by showing an improvement over time of one or more voice parameters/characteristics and/or one or more strengths in one or more voice parameters/characteristics.

The first training session feedback may provide a feedback to the user/first speaker about his/her voice parameters/characteristics, such as related to the deficiency data and/or the strength data. The first training session feedback based on the deficiency data may provide feedback to the first speaker on what voice parameters/characteristics to improve. The first training session feedback based on the strength data may provide positive feedback to the first speaker, e.g. to motivate the first speaker either by showing an improvement over time of voice parameters/characteristics and/or one or more strengths in one or more voice parameters/characteristics. The first training session feedback may comprise feedback related to an outcome or a consequence of the performed first training session for the first speaker/user. In other words, the first training session feedback may give an indicative to the first speaker/user on whether he/she has improved or not on one or more voice parameters/metrics.

In one or more exemplary methods, the method comprises outputting, via the interface of the voice coaching device, the first feedback information. The description of the outputting of the first training information may also apply to the outputting of the first feedback information.

In one or more exemplary methods, the method comprises obtaining second voice data based on the second audio data. The description of the first voice data VD_1 may also apply to the second voice data VD_2. The obtaining of the second voice data may occur later in time than the first voice data. For example, the second audio data and/or the second voice data may be obtained for a determined time period or time interval after the first speaker has performed the first training session. For example, the second audio data and/or the second voice data may be obtained for the days, weeks, and/or months following the performance of the first training session, e.g. to determine an outcome or a consequence of the performance of the first training session on the first voice.

In one or more exemplary methods, the method comprises determining whether the second voice data satisfies a second training criterion. The description of the determination of whether the first voice data satisfies a first training criterion may also apply to the determination of whether the second voice data satisfies a second training criterion. The description of the first training criterion may apply to the second training criterion.

In one or more exemplary methods, the second training criterion may comprise a second threshold value larger than the first threshold value of the first criterion. For example, the first speaker may have improved one or more voice parameters/characteristics after having performed the first training session. The threshold for determining whether the first speaker needs to perform further trainings, such as a second training session, may increase proportionally with the performances of the first speaker, e.g. for a continuous improvement of the first voice of the first speaker. In one or more exemplary methods, the first criterion may have been determined to be too high in relation to the first voice. The second training criterion may therefore comprise a second threshold lower than the first threshold, for example when the first speaker may have deteriorated one or more parameters/characteristics after having performed the first training session.

In one or more exemplary methods, the method comprises in accordance with determining that the second voice data satisfies the second training criterion, determining a second training session. The description of the determination of whether the first voice data satisfies a first training criterion may also apply to the determination of whether the second voice data satisfies a second training criterion. After a period of time, the first voice of the first speaker may have deteriorated, e.g. one or more voice parameters/characteristics may have deteriorated. It may therefore be determined whether the first voice of the first speaker still satisfies a determined performance after that period of time. The first speaker may therefore be retrained continuously after having performed one or more training sessions, such as the first training session. The second training criterion may be indicative of whether the user/speaker shall be coached or trained for different deficiencies and/or speaker metrics of the first voice than the first training criterion. In other words, the first training session may be configured to improve a first set of deficiencies of the first voice, and the second training session may be configured to improve a second set of deficiencies of the first voice. For example, the second training criterion may comprise a second speaking tone criterion/parameter, a second speech trait criterion/parameter, a second vocal trait criterion/parameter, and/or a second time parameter/criterion (for example a time limit before the first speaker has to perform the second training session). In other words, the second training criterion may comprise one or more second conditions to be satisfied by the first voice data.

In one or more exemplary methods, the method comprises outputting, via the interface of the voice coaching device, second training information indicative of the second training session. The description of the outputting of the first training information may also apply to the outputting of the second training information. The second training information may be merged with the first feedback information. For example, when the first feedback information is indicative of first training session feedback comprising a recommendation to perform further training, the first feedback information may also comprise second training information indicative of the second training session. In other words, if it is determined that the first speaker needs more training, the first feedback information may also indicate to the first speaker that he/she should perform a second training session. In other words, when previous training information, such as first training information and/or first feedback information/report, exists, the second training information may comprise second feedback information comprising a comparison showing changes relative to the first feedback information. For example, the second feedback information may comprise highlighting one or more improvements or deteriorations, such as deficiencies and/or strengths of the first speaker/user.

In one or more exemplary methods, the method comprises aggregating the first voice data and the second voice data to voice data. The voice data may comprise both the first voice data and the second voice data. The voice data may comprise a comparison of the first voice data and the second voice data.

In one or more exemplary methods, the method comprises determining whether the voice data satisfies a third training criterion. The description of the determination of whether the first voice data satisfies a first training criterion may also apply to the determination of whether the voice data satisfies a third training criterion. The description of the first training criterion may apply to the third training criterion. The third criterion may be based on a comparison of the first voice data and the second voice data. For example, the first speaker may have improved one or more voice parameters/characteristics after having performed the first training session.

In one or more exemplary methods, the method comprises in accordance with determining that the voice data satisfies the third training criterion, determining a third training session.

After a period of time, the first voice of the first speaker may have deteriorated, e.g. one or more voice parameters/characteristics may have deteriorated. It may therefore be determined whether the first voice of the first speaker still satisfies a determined performance after that period of time. The first speaker may therefore be retrained continuously after having performed one or more training sessions, such as the first training session. The third training criterion may be indicative of whether the user/speaker shall be coached or trained for different deficiencies and/or speaker metrics of the first voice than the first training criterion and the second training criterion. In other words, the first training session may be configured to improve a first set of deficiencies of the first voice, the second training session may be configured to improve a second set of deficiencies of the first voice, and the third training session may be configured to improve a third set of deficiencies of the first voice. For example, the third training criterion may comprise a third speaking tone criterion/parameter, a third speech trait criterion/parameter, a third vocal trait criterion/parameter, and/or a third time parameter/criterion (for example a time limit before the first speaker has to perform the third training session). In other words, the third training criterion may comprise one or more third conditions to be satisfied by the first voice data.

In one or more exemplary methods, the method comprises outputting, via the interface of the voice coaching device, third training information indicative of the third training session. The description of the outputting of the first training information may also apply to the outputting of the third training information. The third training information may be merged with the first feedback information. For example, when the first feedback information is indicative of first training session feedback comprising a recommendation to perform further training, the first feedback information may also comprise third training information indicative of the third training session. In other words, if it is determined that the first speaker needs more training, the first feedback information may also indicate to the first speaker that he/she should perform a third training session.

A voice coaching system is disclosed. The voice coaching system comprises a server device and a voice coaching device. The voice coaching device, such as the processor of the voice coaching device, is configured to perform any of the methods according to this disclosure.

A voice coaching system is disclosed. The voice coaching system comprises a server device and a voice coaching device. The voice coaching device comprises a processor, a memory, and an interface. The voice coaching system is configured to obtain, e.g. using the voice coaching device and/or the server device, audio data representative of one or more voices, the audio data including first audio data of a first voice.

The voice coaching device may for example comprise one or more of a mobile phone, a computer, and a tablet. The voice coaching device may for example be a user device, such as a mobile phone or a computer, configured to perform a call between a user and another person. The voice coaching device may be configured to obtain first audio input, such as first audio input from a conversation or a call between the user and another person. For example, the voice coaching device may act as call agent device where the user may be an agent, such as an agent of a call center, such as a support call center, an after sales call center, a marketing call center, or a sales call center. The voice coaching device may for example be a user device, such as a mobile phone or a computer, configured to record first audio input from a first speaker/user, such as record the first speaker speaking or talking. The voice coaching device may be configured to obtain one or more audio signals, e.g. comprised in the audio data. The voice coaching device may be configured to generate one or more audio signals, including a first audio signal, e.g. comprised in the first audio data. The first audio signal may be based on the first audio input, and the first audio data may be based on the first audio signal.

The voice coaching system is configured to obtain, e.g. using the voice coaching device and/or the server device, first voice data based on the first audio data.

The voice coaching system is configured to determine, e.g. using the voice coaching device and/or the server device, whether the first voice data satisfies a first training criterion.

The voice coaching system is configured to in accordance with a determination that the first voice data satisfies the first training criterion, determine, e.g. using the voice coaching device and/or the server device, a first training session.

The voice coaching system is configured to output, via the interface of the voice coaching device, first training information indicative of the first training session. The interface of the voice coaching device may comprise a first display. The processor of the voice coaching device may be configured to display, on the interface, e.g. first display, one or more user interfaces, such as user interface screens, including a first user interface and/or a second user interface, e.g. being the first training session and/or the first training representation e.g. comprising one or more exercises. A user interface may comprise one or more, such as a plurality of user interface objects. For example, the first user interface may comprise a first primary user interface object and/or a first secondary user interface object. A second user interface may comprise a second primary user interface object and/or a second secondary user interface object. A user interface may be referred to as a user interface screen.

An input, such as the user input, may comprise a touch (e.g. a tap, a force touch, a long press), a click (such as a mouse click), a typing (such as a typing on a keyboard), and/or a movement of contact (e.g. a swipe gesture, e.g. for toggling). The movement on contact may be detected by a touch sensitive surface, e.g. on the first display of the voice coaching device. Thus, the first display may be a touch sensitive display. The first input (such as first user input) may comprise a lift off. A user input, such as the first primary user input, the second primary user input and/or the second secondary user input, may comprise a touch and a movement followed by a lift off.

The first display of the voice coaching device may be configured to detect a user input, such as a first primary user input. The user input may comprise a touch input from the user, for example when the first display comprises a touch-sensitive display. The user input may comprise a contact on the touch sensitive display and/or a keyboard comprised in or connected to the voice coaching device. A touch-sensitive display may provide a first user interface and/or a second user interface (such as an input interface) and an output interface between the voice coaching device and the user. The processor of the voice coaching device may be configured to receive and/or send electrical signals from/to touch-sensitive display. A touch-sensitive display may be configured to display visual output to the user, e.g. the first training session and/or the first training information. The visual output optionally includes graphics, text, icons, video, audio icons, and any combination thereof (collectively termed "graphics"). For example, some, most, or all of the visual output may be seen as corresponding to user-interface objects. The voice coaching device may also be configured to output first training representations comprising audio output, such as sound representations, audio icons, text output, graphical output, and/or auditory feedback.

The voice coaching system may be a system for coaching and/or training one or more users, such as one or more speakers. The voice coaching system may be a system for monitoring, handling, and/or analysing one or more audio signals, such as a speaker talking, e.g. as a monologue or a conversation. The system may be a system for monitoring, handling, and/or analysing one or more audio signals, such as a conversation, e.g. between two or more people, such as a conversation in a phone call or a meeting. The system may for example comprise or act as a call center system for monitoring, handling, and/or analysing one or more audio signals, such as conversations between two or more people, e.g. a phone call between an agent of the call center system and a customer or caller.

It is to be understood that a description of a feature in relation to method(s) is also applicable to the corresponding feature in the voice coaching device, server device, and/or system.

FIG. 1 schematically illustrates an exemplary voice coaching system, such as voice coaching system 2 according to the present disclosure. The system 2 comprises a voice coaching device 10 and optionally a server device 20. The voice coaching device 10 comprises a memory 10A, one or more interfaces 10B, and a processor 10C. The server device 20 comprises a memory 20A, one or more interfaces 20B, and one or more processors 20C. A user/first speaker 1A may use the voice coaching device 10, e.g. being a mobile phone or a computer, for performing or receiving training or coaching. The voice coaching device may optionally be configured to perform or receive a call from a speaker 1B, e.g. a second speaker. The speaker 1B may use a speaker electronic device 30 for communicating with the user 1A.

The voice coaching device 10 may be configured to act as a user device that the user 1A may use for training or coaching, e.g. for performing one or more training sessions. The voice coaching device 10 may be configured to act as a user device that the user 1A may use for communicating and/or monitoring a call/conversation with the speaker 1B. The voice coaching device 10, e.g. the processor 10C, is configured to obtain 4, 14 audio data representative of one or more voices, the audio data including first audio data of a first voice. The first voice may for example be the voice of the user 1A. The audio data may comprise one or more audio signals including a first audio signal. The first audio signal may be obtained 22 from the speaker electronic device 30, e.g. via a network 40 such as a global network, e.g. the internet or a telecommunications network. The audio data, such as the first audio data may be obtained 14 from the server device 20, e.g. via the network 40 such as a global network, e.g. the internet or a telecommunications network. The audio data, such as the first audio data may be obtained from the memory 10A. The voice coaching device 10, e.g. the processor 10C, is configured to obtain 4, 14 first voice data based on the first audio data. The voice coaching device 10, e.g. the processor 10C, may be configured to obtain first voice data, such as determine first voice data, on the voice coaching device 10 itself. Optionally, the one or more processors 20C are configured to obtain voice data, such as first voice data, e.g. to determine voice data.

The speaker electronic device 30 may be configured to record audio input 32, such as first audio input, from the speaker 1B, such as record the speaker 1B speaking or talking. The electronic device 30 may be configured to obtain one or more audio signals, such as generate one or more audio signals based on the audio input 32, including a first audio signal based on the first audio input. The speaker electronic device 30 may be configured to transmit 22 audio data, such as the first audio signal, to the voice coaching device 10, e.g. via the network 40. The speaker electronic device 30 may be configured to obtain 24 one or more audio signals from the voice coaching device 10, e.g. based on user input 4, such as user audio input. The user input 4 may be the user 1A speaking or talking, e.g. the voice coaching device 10 recording the user 1A speaking or talking. The user 1A may be the first speaker and/or a second speaker.

The voice coaching system 2 is configured to determine whether the first voice data satisfies a first training criterion.

Optionally, the voice coaching device 10, such as the processor 10C, is configured to determine whether the first voice data satisfies a first training criterion.

Optionally, the one or more processors 20C are configured to determine whether the first voice data satisfies a first training criterion.

The voice coaching system 2 is configured in accordance with determining that the first voice data satisfies the first training criterion, to determine a first training session.

Optionally, the voice coaching device 10, such as the processor 10C, is configured in accordance with determining that the first voice data satisfies the first training criterion, to determine a first training session.

Optionally, the one or more processors 20C are configured in accordance with determining that the first voice data satisfies the first training criterion, to determine a first training session. The one or more processors 20C may be configured to transmit 18 the first training session to the voice coaching device 10, e.g. via the network 40.

The voice coaching system 2 is configured to output 6, via the interface 10B of the voice coaching device 10, first training information indicative of the first training session.

Optionally, the voice coaching device 10, such as the processor 10C, is configured to output 6, via the interface 10B of the voice coaching device 10, first training information indicative of the first training session.

Optionally, the one or more processors 20C may be configured to transmit 18 the first training information indicative of the first training session to the voice coaching device 10, e.g. via the network 40, such as via interface 20B. Optionally, the one or more processors 20C are configured to output 6, 18 via the interface 10B of the voice coaching device 10, first training information indicative of the first training session.

Optionally, the voice coaching system 2 is configured to determine first speaker metric data of a first speaker based on the first audio data, the first speaker metric data including first primary speaker metric data.

Optionally, the voice coaching device 10, such as the processor 10C, is configured to determine first speaker metric data of a first speaker based on the first audio data, the first speaker metric data including first primary speaker metric data.

Optionally, the one or more processors 20C are configured to determine first speaker metric data of a first speaker based on the first audio data, the first speaker metric data including first primary speaker metric data. Optionally, the one or more processors 20C may be configured to transmit 18 the first speaker metric data including first primary speaker metric data to the voice coaching device 10, e.g. via the network 40, such as via interface 20B.

Optionally, the voice coaching system 2 is configured to determine first deficiency data indicative of one or more deficiencies of the first voice.

Optionally, the voice coaching device 10, such as the processor 10C, is configured to determine first deficiency data indicative of one or more deficiencies of the first voice.

Optionally, the one or more processors 20C are configured to determine first deficiency data indicative of one or more deficiencies of the first voice. Optionally, the one or more processors 20C may be configured to transmit 18 the first deficiency data to the voice coaching device 10, e.g. via the network 40, such as via interface 20B.

Optionally, the voice coaching system 2 is configured to determine a first training representation.

Optionally, the voice coaching device 10, such as the processor 10C, is configured to determine a first training representation.

Optionally, the one or more processors 20C are configured to determine a first training representation. Optionally, the one or more processors 20C may be configured to transmit 18 the first training representation to the voice coaching device 10, e.g. via the network 40, such as via interface 20B.

Optionally, the voice coaching system 2 is configured to display a training user interface object on a display 6 of the interface 10B.

Optionally, the voice coaching device 10, such as the processor 10C, is configured to display 6 a training user interface object on a display of the interface 10B.

Optionally, the one or more processors 20C are configured to transmit 18 a training user interface object to be displayed 6 on a display of the interface 10B.

Optionally, the voice coaching system 2 is configured to determine that a user has performed the first training session. Optionally, the voice coaching system 2 is configured to obtain second audio data of the first voice. Optionally, the voice coaching system 2 is configured to obtain second voice data based on the second audio data. Optionally, the voice coaching system 2 is configured to determine first feedback information indicative of first training session feedback based on the second voice data. Optionally, the voice coaching system 2 is configured to output 6, via the interface 10B of the voice coaching device 10, the first feedback information.

Optionally, the voice coaching device 10, such as the processor 10C, is configured to determine that a user has performed the first training session. Optionally, the voice coaching device 10, such as the processor 10C, is configured to obtain second audio data of the first voice. Optionally, the voice coaching device 10, such as the processor 10C, is configured to obtain second voice data based on the second audio data. Optionally, the voice coaching device 10, such as the processor 10C, is configured to determine first feedback information indicative of first training session feedback based on the second voice data. Optionally, the voice coaching device 10, such as the processor 10C, is configured to output 6, via the interface 10B of the voice coaching device 10, the first feedback information.

Optionally, the one or more processors 20C are configured to determine that a user has performed the first training session. Optionally, the one or more processors 20C are configured to obtain second audio data of the first voice. Optionally, the one or more processors 20C are configured to obtain second voice data based on the second audio data. Optionally, the one or more processors 20C are configured to determine first feedback information indicative of first training session feedback based on the second voice data. Optionally, the one or more processors 20C are configured to output 6, via the interface 10B of the voice coaching device 10, the first feedback information.

Optionally, the voice coaching system 2 is configured to obtain second voice data based on the second audio data. Optionally, the voice coaching system 2 is configured to determine whether the second voice data satisfies a second training criterion. Optionally, the voice coaching system 2 is configured in accordance with determining that the second voice data satisfies the second training criterion, to determine a second training session. Optionally, the voice coaching system 2 is configured to output, via the interface of the voice coaching device, second training information indicative of the second training session.

Optionally, the voice coaching device 10, such as the processor 10C, is configured to obtain second voice data based on the second audio data. Optionally, the voice coaching device 10, such as the processor 10C, is configured to determine whether the second voice data satisfies a second training criterion. Optionally, the voice coaching device 10, such as the processor 10C, is configured in accordance with determining that the second voice data satisfies the second training criterion, to determine a second training session. Optionally, the voice coaching device 10, such as the processor 10C, is configured to output, via the interface of the voice coaching device, second training information indicative of the second training session.

Optionally, the one or more processors 20C are configured to obtain second voice data based on the second audio data. Optionally, the one or more processors 20C are configured to determine whether the second voice data satisfies a second training criterion. Optionally, the one or more processors 20C are configured in accordance with determining that the second voice data satisfies the second training criterion, to determine a second training session. Optionally, the one or more processors 20C are configured to output, via the interface of the voice coaching device, second training information indicative of the second training session.

Optionally, the voice coaching system 2 is configured to aggregate the first voice data and the second voice data to voice data. Optionally, the voice coaching system 2 is configured to determine whether the voice data satisfies a third training criterion. Optionally, the voice coaching system 2 is configured in accordance with determining that the voice data satisfies the third training criterion, to determine a third training session. Optionally, the voice coaching system 2 is configured to output, via the interface of the voice coaching device, third training information indicative of the third training session.

Optionally, the voice coaching device 10, such as the processor 10C, is configured to aggregate the first voice data and the second voice data to voice data. Optionally, the voice coaching device 10, such as the processor 10C, is configured to determine whether the voice data satisfies a third training criterion. Optionally, the voice coaching device 10, such as the processor 10C, is configured in accordance with determining that the voice data satisfies the third training criterion, to determine a third training session. Optionally, the voice coaching device 10, such as the processor 10C, is configured to output, via the interface of the voice coaching device, third training information indicative of the third training session.

Optionally, the one or more processors 20C are configured to aggregate the first voice data and the second voice data to voice data. Optionally, the one or more processors 20C are configured to determine whether the voice data satisfies a third training criterion. Optionally, the one or more processors 20C are configured in accordance with determining that the voice data satisfies the third training criterion, to determine a third training session. Optionally, the one or more processors 20C are configured to output, via the interface of the voice coaching device, third training information indicative of the third training session.

Figure 2A:
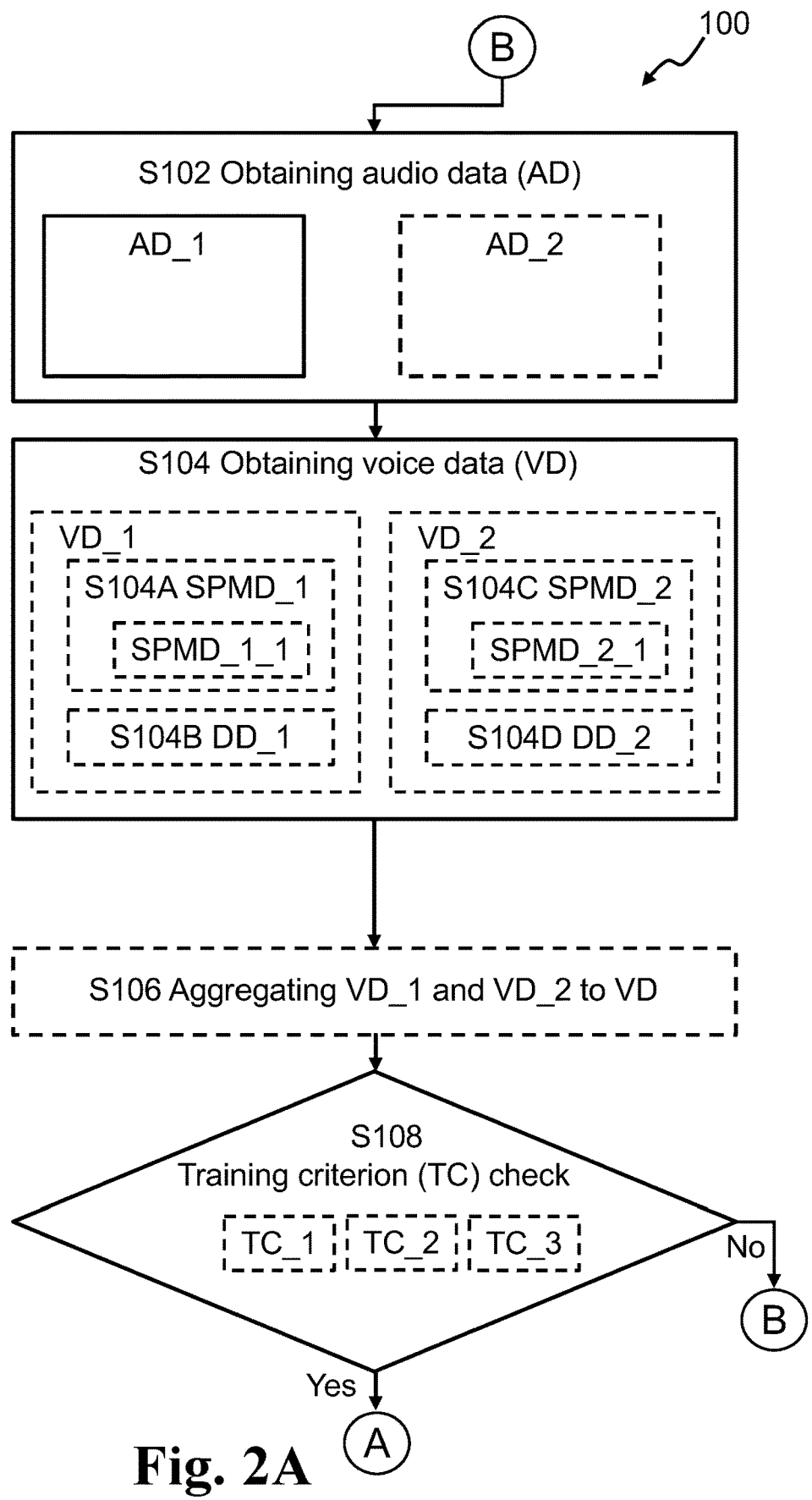
FIGS. 2A-B are flow diagrams of an exemplary method according to the present disclosure, FIG. 3. schematically illustrates an exemplary data structure according to the present disclosure, FIG. 4 schematically illustrates an exemplary voice coaching device according to the present disclosure, and FIG. 5. schematically illustrates a flow diagram of an exemplary method according to the present disclosure.
Figure 2B:
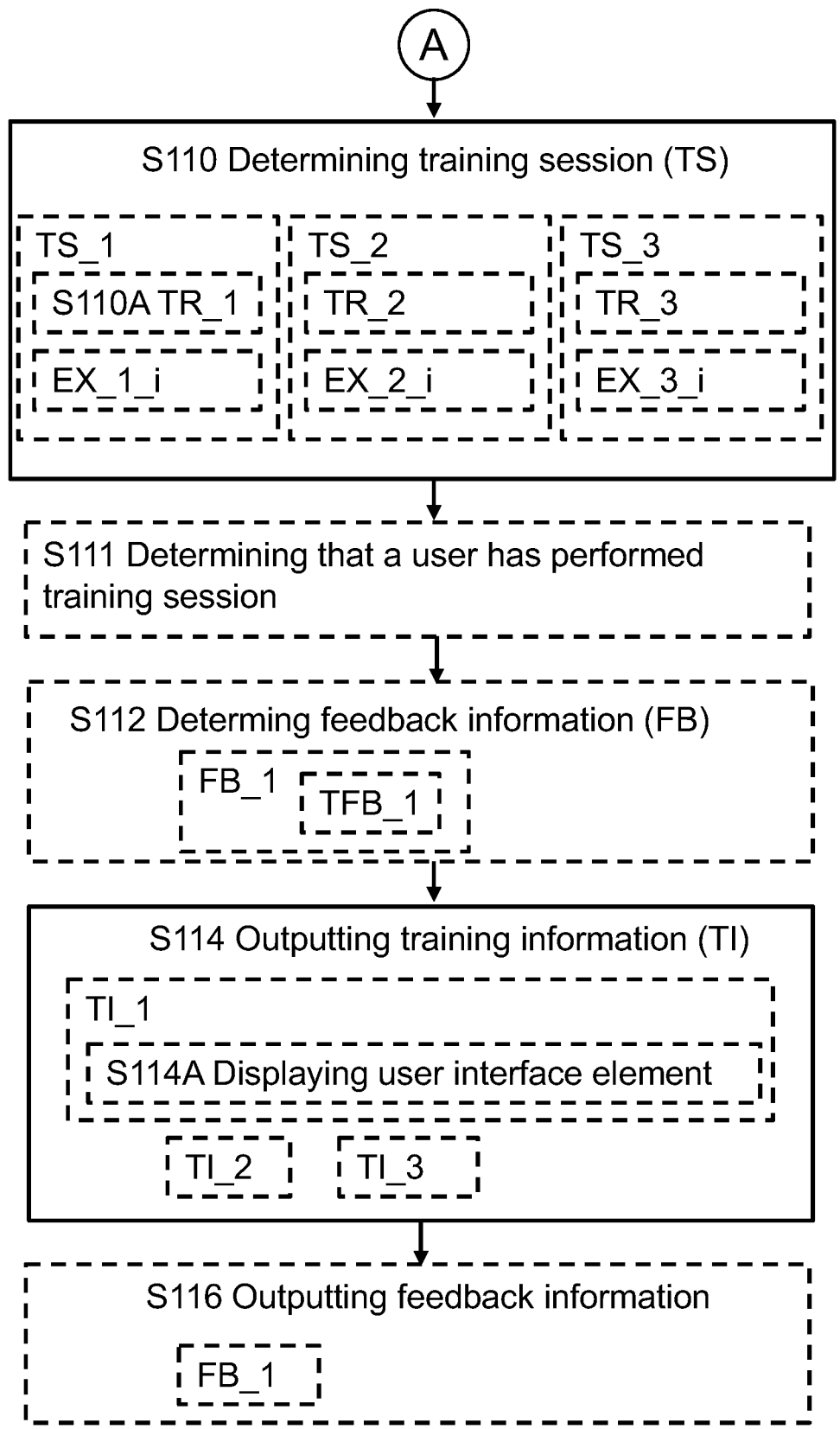

The voice coaching device 10 and/or the server device 20 may be configured to perform any of the methods disclosed in FIGS. 2A, 2B.

The voice coaching device 10, e.g. the processor 10C is optionally configured to perform any of the operations disclosed in FIGS. 2A-2B (such as any one or more of S104A, S104B, S104C, S104D, S106, S110A, S110B, S111, S112, S114A, S116). The operations of the voice coaching device may be embodied in the form of executable logic routines (for example, lines of code, software programs, etc.) that are stored on a non-transitory computer readable medium (for example, memory 10A) and are executed by the processor 10C).

Furthermore, the operations of the voice coaching device 10 may be considered a method that the voice coaching device 10 is configured to carry out. Also, while the described functions and operations may be implemented in software, such functionality may as well be carried out via dedicated hardware or firmware, or some combination of hardware, firmware and/or software.

The server device, e.g. the processor 20C, is optionally configured to perform any of the operations disclosed in FIGS. 2A-2B (such as any one or more of S104A, S104B, S104C, S104D, S106, S110A, S110B, S111, S112, S114A, S116). The operations of the server device may be embodied in the form of executable logic routines (for example, lines of code, software programs, etc.) that are stored on a non-transitory computer readable medium (for example, memory 20A) and are executed by the one or more processors 20C). Furthermore, the operations of the server device 20 may be considered a method that the server device 20 is configured to carry out. Also, while the described functions and operations may be implemented in software, such functionality may as well be carried out via dedicated hardware or firmware, or some combination of hardware, firmware and/or software.

FIGS. 2A and 2B show a flow diagram of an exemplary method. A method 100 of operating a voice coaching system comprising a voice coaching device is disclosed. The voice coaching device comprises an interface, a processor, and a memory. The method 100 comprises obtaining S102 audio data AD including first audio data AD_1 of a first voice, e.g. of a first speaker, and optionally second audio data AD_2. The method comprises obtaining S104 voice data VD, based on the audio data AD. The method may comprise obtaining first voice data VD_1, based on the first audio data AD_1. Optionally, the method comprises obtaining second voice data VD_2, based on the second audio data AD_2.

In one or more exemplary methods, obtaining S104 first voice data VD_1 based on the first audio data AD_1 comprises determining S104A first speaker metric data SPMD_1 of a first speaker based on the first audio data AD_1, the first speaker metric data SPMD_1 including first primary speaker metric data SPMD_1_1.

In one or more exemplary methods, obtaining S104 second voice data VD_2 based on the second audio data AD_2 comprises determining S104C second speaker metric data SPMD_2 of a first speaker based on the second audio data AD_2, the second speaker metric data SPMD_2 including second primary speaker metric data SPMD_2_1.

In one or more exemplary methods, obtaining S104 first voice data VD_1 comprises determining S104B first deficiency data DD_1 indicative of one or more deficiencies of the first voice.

In one or more exemplary methods, obtaining S104 second voice data VD_2 comprises determining S104D second deficiency data DD_2 indicative of one or more deficiencies of the first voice.

The method 100 comprises determining S108 whether the voice data VD satisfies a training criterion TC. Optionally, determining S108 whether the voice data VD satisfies a training criterion TC comprises determining whether the first voice data VD_1 satisfies a first training criterion TC_1. Optionally, determining S108 whether the voice data VD satisfies a training criterion TC comprises determining whether the second voice data VD_2 satisfies a second training criterion TC_2.

In one or more exemplary methods, the method 100 comprises aggregating S106 the first voice data VD_1 and the second voice data VD_2 to voice data VD.

Optionally, determining S108 whether the voice data VD satisfies a training criterion TC comprises determining whether the voice data VD satisfies a third training criterion TC_3. Optionally, when it is not determined that the voice data VD satisfies the training criterion TC, the method 100 comprises reiterating B the method 100.

The method 100 comprises in accordance with determining that the voice data VD satisfies A the training criterion TC, determining S110 a training session TS.

Optionally, the method 100 comprises in accordance with determining that the first voice data VD_1 satisfies A the first training criterion TC_1, determining S110 a first training session TS_1. Optionally, the method 100 comprises in accordance with determining that the second voice data VD_2 satisfies A the second training criterion TC_2, determining S110 a second training session TS_2. Optionally, the method 100 comprises in accordance with determining that the voice data VD satisfies A the third training criterion TC_3, determining S110 a third training session TS_3. Optionally, when it is not determined that the first voice data VD_1 satisfies the first training criterion TC_1, the method 100 comprises reiterating B the method 100. Optionally, when it is not determined that the second voice data VD_2 satisfies the second training criterion TC_2, the method 100 comprises reiterating B the method 100. Optionally, when it is not determined that the voice data VD satisfies the third training criterion TC_3, the method 100 comprises reiterating B the method 100.

In one or more exemplary methods, determining S110 the first training session TS_1 comprises determining S110A a first training representation TR_1, e.g. comprising one or more exercises, such as first exercises EX_1_i. Optionally, determining S110 the second training session TS_2 comprises determining S110A a first training representation TR_2, e.g. comprising one or more exercises, such as second exercises EX_2_i. Optionally, determining S110 the second training session TS_2 comprises determining S110A a first training representation TR_2, e.g. comprising one or more exercises, such as third exercises EX_3_i.

In one or more exemplary methods, the method 100 comprises determining S111 that a user has performed the first training session TS_1.

In one or more exemplary methods, the method 100 comprises determining S112 feedback information FB indicative of training session feedback TFB based on the voice data VD. In one or more exemplary methods, the method 100 comprises determining S112 first feedback information FB_1 indicative of first training session feedback TFB_1 based on the second voice data VD_2.

The method 100 comprises outputting S116, via the interface of the voice coaching device, training information TI indicative of the training session TS. Optionally, outputting S116 training information TI comprises outputting first training information TI_1 indicative of the first training session TS_1. In one or more exemplary methods, outputting first training information TI_1 comprises displaying S114A a training user interface object on a display of the interface. Optionally, outputting S116 training information TI comprises outputting second training information TI_2 indicative of the second training session TS_2. Optionally, outputting S116 training information TI comprises outputting third training information TI_3 indicative of the third training session TS_3.

In one or more exemplary methods, the method 100 comprises outputting S116, via the interface of the voice coaching device, the feedback information FB. Optionally, outputting S116 the feedback information FB comprises outputting the first feedback information FB_1.

Figure 3:
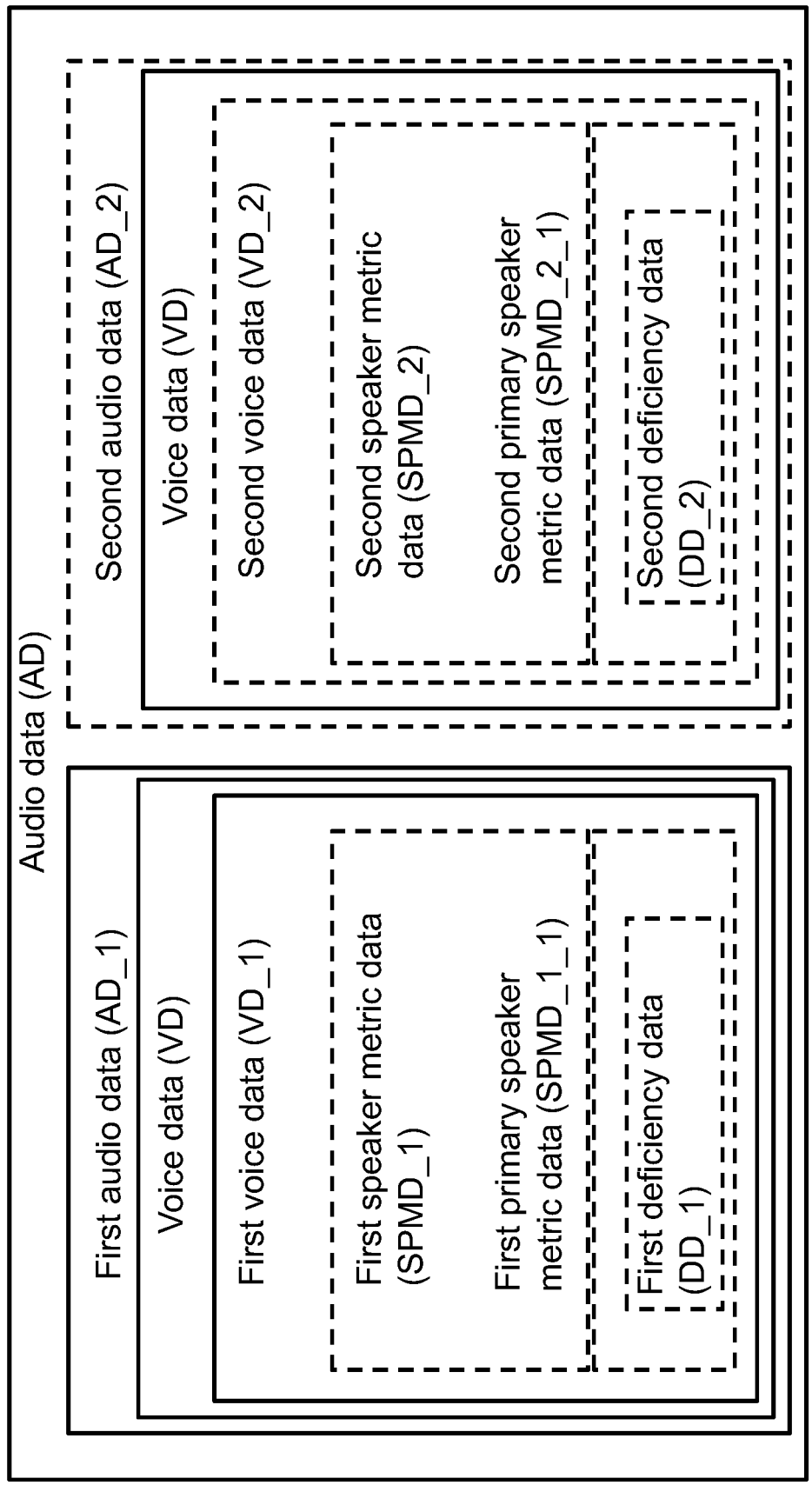

FIG. 3. schematically illustrates an exemplary data structure according to the present disclosure. The audio data AD comprises first audio data AD_1 of a first voice. The audio data AD comprises voice data VD. Optionally, the audio data AD comprises second audio data AD_2 of the first voice. The first audio data AD_1 comprises voice data VD, including first voice data VD_1. Optionally, the second audio data AD_2 comprises voice data VD, including second voice data VD_2. The first voice data VD_1 optionally comprises first speaker metric data SPMD_1, the first speaker metric data SPMD_1 optionally comprising first primary speaker metric data SPMD_1_1. The first voice data VD_1 optionally comprises first deficiency data DD_1. The second voice data VD_2 optionally comprises second speaker metric data SPMD_2, the second speaker metric data SPMD_2 optionally comprising second primary speaker metric data SPMD_2_1. The second voice data VD_2 optionally comprises second deficiency data DD_2.

Figure 4:
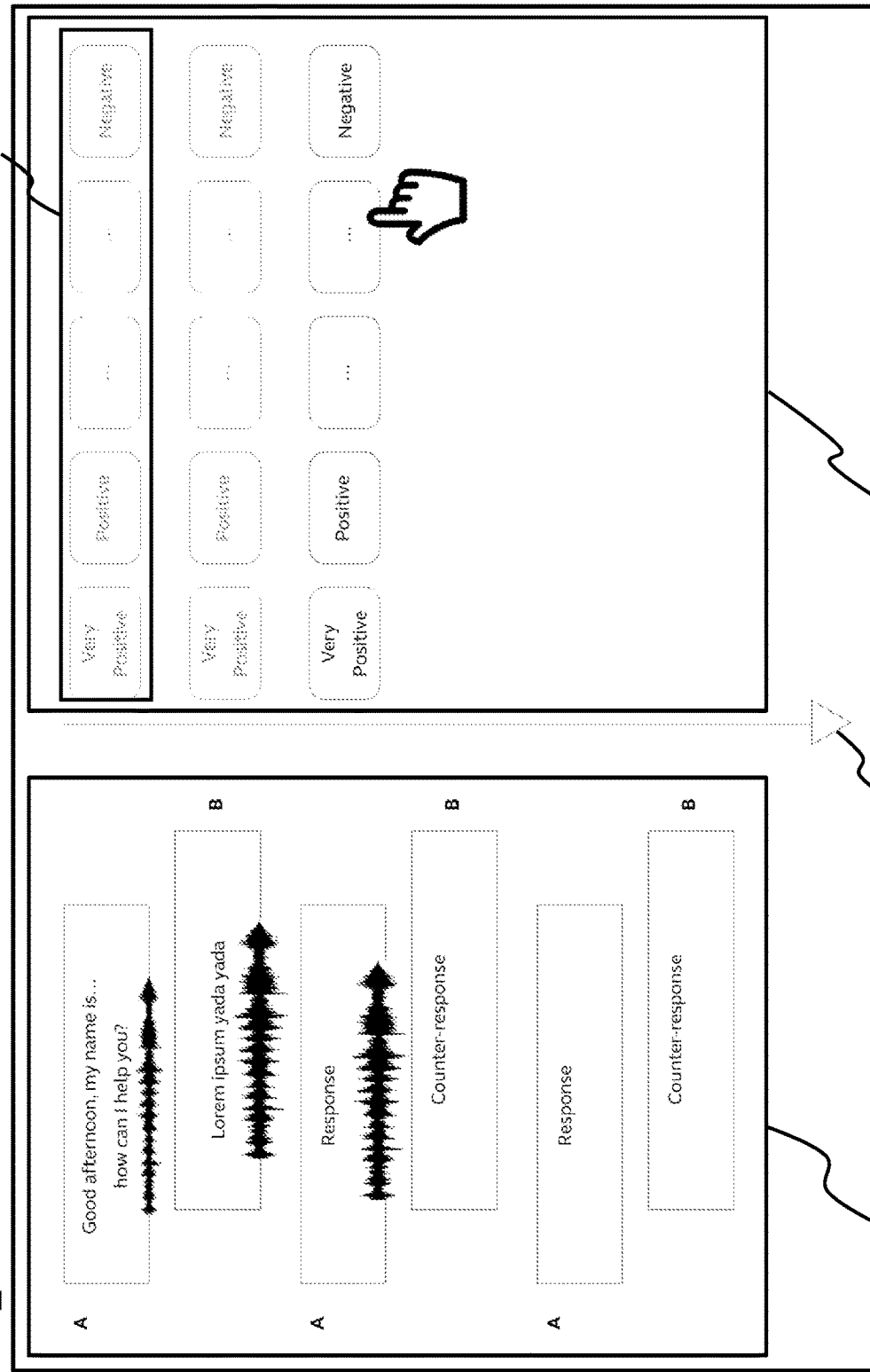

FIG. 4. schematically illustrates an exemplary voice coaching device, such as voice coaching device 10, according to the present disclosure. The voice coaching device 10 is in this example a laptop computer. The voice coaching device 10 may for example be a voice coaching device used by a user (e.g. a first speaker) for training purposes, such as an agent of a call center or support call center. The voice coaching device 10 is configured to display on an interface 10B of the voice coaching device 10, e.g. on a display 11 of the laptop computer, a user interface indicative of training information. The voice coaching device 10 displays a first user interface UI_1, e.g. having a first display region, comprising a plurality of training user interface objects. The user of the voice coaching device 10 may visualize the first training information, such as the first training session, e.g. comprising a first exercise, after it has been determined that first voice data, based on the first audio data of the user/first voice, satisfies a first training criterion. The first training information may provide feedback to the user about the first audio of the first voice of the user, such as the deficiencies to improve for the user.

The first user interface UI_1 is indicative of a first exercise, e.g. being part of a first training session. The first exercise is an exercise for improving the understanding of voice, speech, and/or tone of the user. The first user interface UI_1 comprises a first training user interface object 50, e.g.

arranged in a first primary display region. The first training user interface object 50 represents speech segments of a pre-recorded conversation between a first speaker A, e.g. being an agent, and a second speaker B, e.g. being a client/customer. The first training user interface object 50 comprises three speech segments for the first speaker A and three speech segments for the speaker B. The first user interface UI_1 comprises a second training user interface object 52, e.g. arranged in a first secondary display region. The second training user interface object 52 represents a timeline of the conversation. The first user interface UI_1 comprises a third training user interface object 54, e.g. arranged in a first tertiary display region. The third training user interface object 54 represents a plurality of sets of sentiment type identifiers. Each speech segment in the first training user interface object 50 may have an associated set of sentiment type identifiers in the third training user interface 54. For example, the first speech segment of the first speaker A may have an associated first set of sentiment type identifiers ST_ID_SET_1.

The user performing the first exercise may then label, e.g. by selecting them, a sentiment type identifier selected from the set of sentiment type identifiers to each of the speech segments that the users has listened to. By labelling the sentiment type identifiers to the speech segments, the user may identify one or more sentiment states of the first speaker A and/or the second speaker B, based on the user's perception of the speech segments of the pre-recorded conversation. At the end of the turn/conversation, the voice coaching device 10 may determine first feedback information indicative of first training session feedback, e.g. the user's answers/labelling are compared to a model solution, and the voice coaching device 10 may then be configured to output the first feedback information, e.g. to display a score of the user on the first exercise via the interface 10B, such as on the display 11, based on the comparison. The first exercise may thereby improve the user's understanding of voice, speech, and/or tone of speakers.

Figure 5:
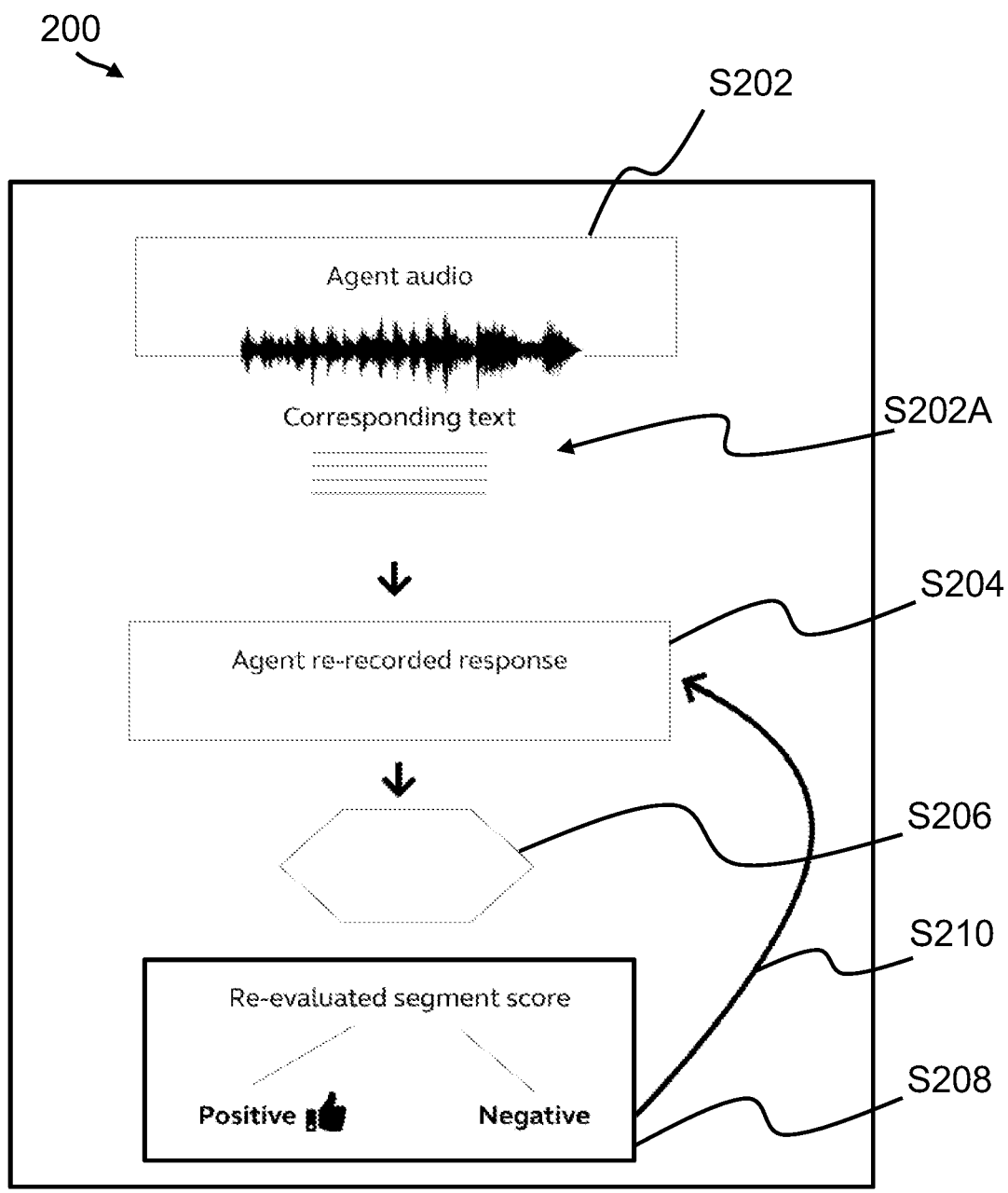

FIG. 5. schematically illustrates a flow diagram of an exemplary method, such as a method 200 of operating a voice coaching system comprising a voice coaching device for performing a training session, part of a training session, and/or an exercise.

The method 200 may be performed on a voice coaching device, such as voice coaching device 10, according to the present disclosure. The method 200 may be applied in relation to a user performing a training session, part of a training session, and/or an exercise comprised in a training session, such as a second exercise. The voice coaching device 10 may in this example be a laptop computer. The voice coaching device 10 may for example be a voice coaching device used by a user (e.g. an agent) for training purposes, such as an agent of a call center or support call center.

The method 200 comprises outputting S202 first audio data of a first voice, such as agent audio of the voice of the user/agent, e.g. via the interface 10B (not shown) of the voice coaching device. Outputting S202 the first audio data of the first voice may comprise outputting a speech segment of the user/agent, where it has been determined that first voice data based on the first audio data satisfied a first training criterion. In other words, outputting S202 the first audio data of the first voice may comprise outputting a speech segment of the user/agent where first deficiency data, such as one or more deficiencies, has been determined. The method 200 may optionally comprise outputting S202A text data, such as a corresponding text to the audio data, e.g. via the interface 10B of the voice coaching device, for the user/agent to be able to redo the speech segment. The user/agent of the voice coaching device may thereby listen to his/her own first audio data and optionally read the corresponding text. Optionally, the method 200 may comprise obtaining, e.g. via the interface 10B of the voice coaching device, the first audio data of the first voice prior to outputting S202 the first audio data.

The method 200 comprises obtaining S204 second audio data of the first voice. The second audio data of the first voice may for example comprise the user/agent re-recording the same speech segment outputted in S202, e.g. such as the same corresponding text, e.g. a response to a customer in a recorded conversation. In other words, the user/agent may, when performing e.g. the second exercise, re-do his/her speech segments where deficiencies were detected with an improved voice, speech. and/or tone. For example, the user/agent may re-do a speech segment with a better speed and/or a more positive tone.

The method 200 comprises obtaining S206 second voice data based on the second audio data. In other words, obtaining S206 second voice data based on the second audio data may comprise determining speaker metric data SPMD and/or deficiency data DD of the user/agent based on the second audio data.

The method 200 comprises determining S208 whether the second voice data satisfies a second training criterion. In other words, determining S208 whether the second voice data satisfies a second training criterion may comprise determining whether the second voice data of the user/agent was sufficiently improved or not. In other words, determining S208 whether the second voice data satisfies a second training criterion may comprise determining whether the user/agent requires more training or not.

Optionally, the method comprises determining first feedback information indicative of first training session feedback. In other words, determining first feedback information indicative of first training session feedback may comprise determining a score of the re-evaluated speech segment. When the score is above a certain threshold the score is positive and when the score is below the threshold, the score is negative. When it is determined that the second voice data satisfies the second training criterion, the method comprises reiterating S210 the obtaining S204 of second audio data of the first voice. In other words, the user/agent may re-do the speech segment until his/her performance is satisfying.

When it is not determined that the second voice data satisfies the second training criterion the method 200 proceeds to another speech segment, another exercise if the second exercise is finished, or stops if the training session is finished.

The first exercise may thereby improve the user's understanding of voice, speech, and/or tone of speakers.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Memory may be one or more of a buffer, a flash memory, a hard drive, a removable media, a volatile memory, a non-volatile memory, a random access memory (RAM), or other suitable device. In a typical arrangement, memory may include a non-volatile memory for long term data storage and a volatile memory that functions as system memory for the processor. Memory may exchange data with processor over a data bus. Memory may be considered a non-transitory computer readable medium.

Memory may be configured to store information (such as information indicative of the one or more audio signals, the one or more sentiment metrics, the one or more appearance metrics, the speaker representations, the sentiment metric data, and/or the appearance metric data) in a part of the memory.

Furthermore, the labelling of a first element does not imply the presence of a second element and vice versa.

It may be appreciated that FIGS. 1-5 comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES

1A user, first speaker
1B speaker, second speaker, caller
2 system
4 user input
6 training information, training representation, feedback information, training session, user output
10 voice coaching device
10A memory
10B one or more interfaces
10C processor
12 transmit
14 obtain
16 obtain
18 transmit
20 server device
20A memory
20B interface
20C one or more processors
22 transmit
24 obtain
30 speaker electronic device
32 speaker input, audio input
40 network
50 first training user interface object
52 second training user interface object
54 third training user interface object
AD audio data
AD_1 first audio data
AD_2 second audio data
AS audio signal
AS_1 first audio signal
AS_2 second audio signal
A_ID appearance identifier
A_ID_1 first appearance identifier
A_ID_1_1 first primary appearance identifier
A_ID_1_2 first secondary appearance identifier
A_ID_1_3 first tertiary appearance identifier
A_ID_2_1 second primary appearance identifier
A_ID_2_2 second secondary appearance identifier
A_ID_2_3 second tertiary appearance identifier
A_ID_SET set of appearance identifiers
A_ID_SET_1 primary set of appearance identifiers
A_ID_SET_2 secondary set of appearance identifiers
ACS appearance confidence score
ACS_1 first appearance confidence score
ACS_1_1 first primary appearance confidence score
ACS_1_2 first secondary appearance confidence score
ACS_2 second appearance confidence score
ACS_2_1 second primary appearance confidence score
AL appearance level
AL_1 first appearance level
AL_1_1 first primary appearance level
AL_1_2 first secondary appearance level
AL_1_3 first tertiary appearance level
AL_2_1 second primary appearance level
AL_2_2 second secondary appearance level
AL_2_3 second tertiary appearance level
AM appearance metric
AMD appearance metric data AM_1 first appearance metric
AM_1_1 first primary appearance metric
AM_1_2 first secondary appearance metric
AM_1_3 first tertiary appearance metric
AM_2_1 secondary primary appearance metric
AM_2_2 second secondary appearance metric
AM_2_3 second tertiary appearance metric
DD deficiency data
DD_1 first deficiency data
DD_2 second deficiency data
SCS confidence score
SCS_1 first confidence score
SCS_1_1 first primary confidence score
SCS_1_2 first secondary confidence score
SCS_2_1 second primary confidence score
SL sentiment level
SL_1_1 first primary sentiment level
SL_1_2 first secondary sentiment level
SL_2_1 second primary sentiment level
SM sentiment metrics
SM_1 first sentiment metric
SM_1_1 first primary sentiment metric
SM_1_2 first secondary sentiment metric
SM_2 second sentiment metric
SM_2_1 second primary sentiment metric
SM_2_2 second secondary sentiment metric
ST_ID_1_1 first primary sentiment type identifier
ST_ID_1_2 first secondary sentiment type identifier
ST_ID_2_1 second primary sentiment type identifier
ST_ID_2_2 second secondary sentiment type identifier
ST_ID_SET_1 primary set of sentiment type identifiers
ST_ID_SET_2 secondary set of sentiment type identifiers
SMD sentiment metric data
SPMD speaker metric data
SPMD_1 first speaker metric data
SPMD_1_1 first primary speaker metric data
SPMD_1_2 first secondary speaker metric data
SPMD_1_3 first tertiary speaker metric data
SPMD_2 second speaker metric data
SPMD_2_1 second primary speaker metric data
ST_ID sentiment type identifier
ST_ID_1 first sentiment type identifier
ST_ID_1_1 first primary sentiment type identifier
ST_ID_1_2 first secondary sentiment type identifier
ST_ID_SET set of sentiment type identifiers
ST_ID_SET_1 primary set of sentiment type identifiers
ST_ID_SET_2 secondary set of sentiment type identifiers
UI_1 first user interface
VD voice data
VD_1 first voice data
VD_2 second voice data
100 method of operating a voice coaching system
S102 obtaining audio data
S104 obtaining voice data
S104A determining first speaker metric data
S104B determining first deficiency data
S104C determining second speaker metric data
S104D determining second deficiency data
S106 aggregating first voice data and second voice data to voice data
S108 determining whether the voice data satisfies a training criterion
S110 determining a first training session
S110A determining a first training representation
S111 determining that a user has performed the training session
S112 determining feedback information
S114 outputting training information
S114A displaying user interface element
S116 outputting feedback information
200 method of operating a voice coaching system
S202 outputting first audio data of a first voice
S202A outputting text data
S204 obtaining second audio data of the first voice
S206 obtaining second voice data based on the second audio data
S208 determining whether the second voice data satisfies a second training criterion
B reiterate, restart

The invention claimed is:

1. A method of operating a voice coaching system comprising a voice coaching device, the voice coaching device comprising an interface, a processor, and a memory, the method comprising:
obtaining audio data representative of one or more voices, the audio data including a first audio data of a first voice of a first speaker, wherein the first audio data comprises one or more first audio inputs from one or more conversations performed by the first speaker, wherein at least one of the one or more conversations is a system-monitored conversation;
obtaining a first voice data based on the first audio data, wherein obtaining the first voice data comprises determining a first deficiency data indicative of one or more deficiencies of the first voice, and wherein the first deficiency data comprises one or more of a speaking tone deficiency, a speech trait deficiency, and a vocal trait deficiency;
determining that the first voice data satisfies a first training criterion, wherein the satisfying of the first training criterion indicates that the first speaker shall be coached or trained for one or more deficiencies of the first voice;
determining, based on the determining that the first voice data satisfies the first training criterion, a first training session;
outputting, via the interface of the voice coaching device, a first training information indicative of the first training session.

2. The method according to claim 1, wherein the obtaining of the first voice data based on the first audio data comprises determining a first speaker metric data of a first speaker based on the first audio data, the first speaker metric data including a first primary speaker metric data.

3. The method according to claim 2, wherein the first training criterion is based on the first speaker metric data.

4. The method according to claim 1, wherein the first training criterion is based on a first standard.

5. The method according to claim 1, wherein determining the first training session comprises determining a first training representation.

6. The method according to claim 1, wherein the first training session comprises one or more first exercises representative of the first deficiency data.

7. The method according to claim 6, wherein the one or more first exercises comprise one or more of a speaking tone exercise, a speech trait exercise, and a vocal trait exercise.

8. The method according to claim 1, wherein the first training information is a recommendation to perform the first training session, and wherein outputting the first training information comprises displaying a training user interface object on a display of the interface.

43

9. The method according to claim 1, the method comprising:
  determining that the first speaker has performed the first training session;
  obtaining a second audio data of the first voice;
  obtaining a second voice data based on the second audio data;
  determining a first feedback information indicative of a first training session feedback based on the second voice data; and
  outputting, via the interface of the voice coaching device, the first feedback information.

10. The method according to claim 1, the audio data including a second audio data of the first voice, the method comprising:
  obtaining a second voice data based on the second audio data;
  determining whether the second voice data satisfies a second training criterion;
  in accordance with determining that the second voice data satisfies the second training criterion, determining a second training session; and
  outputting, via the interface of the voice coaching device, a second training information indicative of the second training session.

11. The method according to claim 10, the method comprising:
  aggregating the first voice data and the second voice data to voice data;
  determining whether the voice data satisfies a third training criterion;
  in accordance with determining that the voice data satisfies the third training criterion, determining a third training session; and
  outputting, via the interface of the voice coaching device, a third training information indicative of the third training session.

12. A voice coaching system comprising a server device and a voice coaching device, the voice coaching device comprising an interface, a processor, and a memory, wherein the voice coaching system is configured to:
  obtain audio data representative of one or more voices, the audio data including a first audio data of a first voice of a first speaker, wherein the first audio data comprises one or more first audio inputs from one or more conversations performed by the first speaker, wherein at least one of the one or more conversations is a system-monitored conversation;
  obtain a first voice data based on the first audio data, wherein obtaining the first voice data comprises determining a first deficiency data indicative of one or more deficiencies of the first voice, and wherein the first deficiency data comprises one or more of a speaking tone deficiency, a speech trait deficiency, and a vocal trait deficiency;
  determine whether the first voice data satisfies a first training criterion, wherein the satisfying of the first training criterion indicates that the first speaker shall be coached or trained for one or more deficiencies of the first voice;
  determine, based on the determination that the first voice data satisfies the first training criterion, a first training session;
  output, via the interface of the voice coaching device, a first training information indicative of the first training session.

44

13. The voice coaching system according to claim 12, wherein to obtain a first voice data based on the first audio data comprises determining a first speaker metric data of a first speaker based on the first audio data, the first speaker metric data including a first primary speaker metric data.

14. The voice coaching system according to claim 12, wherein the voice coaching system is configured to:
  determine that the first speaker has performed the first training session;
  obtain a second audio data of the first voice;
  obtain a second voice data based on the second audio data;
  determine a first feedback information indicative of a first training session feedback based on the second voice data; and
  output, via the interface of the voice coaching device, the first feedback information.

15. The voice coaching system according to claim 12, wherein the audio data includes a second audio data of the first voice, and wherein the voice coaching system is configured to:
  obtain a second voice data based on the second audio data;
  determine whether the second voice data satisfies a second training criterion;
  in accordance with a determination that the second voice data satisfies the second training criterion, determine a second training session; and
  output, via the interface of the voice coaching device, a second training information indicative of the second training session.

16. A voice coaching device comprising an interface, a processor, and a memory, wherein the voice coaching device is configured to:
  obtain audio data representative of one or more voices, the audio data including a first audio data of a first voice of a first speaker, wherein the first audio data comprises one or more first audio inputs from one or more conversations performed by the first speaker, wherein at least one of the one or more conversations is a system-monitored conversation;
  obtain a first voice data based on the first audio data, wherein obtaining the first voice data comprises determining a first deficiency data indicative of one or more deficiencies of the first voice, and wherein the first deficiency data comprises one or more of a speaking tone deficiency, a speech trait deficiency, and a vocal trait deficiency;
  determine that the first voice data satisfies a first training criterion, wherein the satisfying of the first training criterion indicates that the first speaker shall be coached or trained for one or more deficiencies of the first voice;
  in accordance with a determination that the first voice data satisfies the first training criterion, determine a first training session; and
  output, via the interface of the voice coaching device, a first training information indicative of the first training session.

17. The voice coaching device according to claim 16, wherein to obtain a first voice data based on the first audio data comprises to determine a first speaker metric data of a first speaker based on the first audio data, the first speaker metric data including first primary speaker metric data.

18. The voice coaching device according to claim 16, wherein the voice coaching device is configured to:
  determine that the first speaker has performed the first training session;

obtain a second audio data of the first voice;
obtain a second voice data based on the second audio data;
determine a first feedback information indicative of a first training session feedback based on the second voice data; and
output, via the interface of the voice coaching device, the first feedback information.

* * * * *